US012652615B2

(12) United States Patent
Shete et al.

(10) Patent No.: US 12,652,615 B2
(45) Date of Patent: Jun. 9, 2026

(54) SYSTEM AND METHOD FOR CARRIER AND/OR CELL SWITCH OFF/ON OPTIMIZATION BASED ON AN A1 POLICY IN A TELECOMMUNICATIONS NETWORK

(71) Applicant: RAKUTEN MOBILE, INC., Tokyo (JP)

(72) Inventors: Pankaj Tanaji Shete, Tokyo (JP); Awn Muhammad, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 393 days.

(21) Appl. No.: 18/270,741

(22) PCT Filed: Apr. 4, 2023

(86) PCT No.: PCT/US2023/017362
§ 371 (c)(1),
(2) Date: Jul. 3, 2023

(87) PCT Pub. No.: WO2024/210887
PCT Pub. Date: Oct. 10, 2024

(65) Prior Publication Data
US 2025/0048251 A1      Feb. 6, 2025

(51) Int. Cl.
*H04W 4/00* (2018.01)
*G06N 20/00* (2019.01)
(Continued)

(52) U.S. Cl.
CPC ........ *H04W 52/0203* (2013.01); *G06N 20/00* (2019.01); *H04L 41/16* (2013.01); *H04W 16/24* (2013.01); *H04W 24/02* (2013.01)

(58) Field of Classification Search
CPC .............................. H04W 24/02; H04L 41/16
See application file for complete search history.

(56) References Cited

U.S. PATENT DOCUMENTS

2023/0362809 A1* 11/2023 Dixit ..................... H04W 24/10
2023/0370959 A1* 11/2023 Rajendran ............. H04W 48/08
(Continued)

OTHER PUBLICATIONS

International Search Report issued Jul. 19, 2023 in Application No. PCT/US2023/017362.
(Continued)

*Primary Examiner* — Elisabeth Benoit Magloire
(74) *Attorney, Agent, or Firm* — Sughrue Mion, PLLC

(57) ABSTRACT

A method for implementing a carrier and/or cell switch off/on optimization in an O-RAN based on an A1 policy, the method includes: deploying, by the NRT-RIC framework, a AI/ML model to the nRT-RIC; providing, by the rApp, an A1 policy to prepare and execute the cell and/or carrier switch off/on optimization through the NRT-RIC framework to the nRT-RIC; collecting, by the nRT-RIC, data to perform the cell and/or carrier switch off/on via the E2-interface from the O-RU via the E2 node; evaluating, by nRT-RIC, the collected data; generating, by the nRT-RIC, an E2 message and send, by the nRT-RIC, the E2 message to the O-RU via the E2 node; implementing, by the E2 node and the O-RU, the cell and/or carrier switch off/on optimization within the O-RAN; receiving, by the rApp, an A1 policy feedback through an NRT-RIC framework from the O-RU via the E2 node and the nRT-RIC.

20 Claims, 15 Drawing Sheets

(51) Int. Cl.
*H04L 41/16* (2022.01)
*H04W 16/24* (2009.01)
*H04W 24/02* (2009.01)
*H04W 52/02* (2009.01)

(56) References Cited

U.S. PATENT DOCUMENTS

| | | | | |
|---|---|---|---|---|
| 2024/0098629 A1* | 3/2024 | Rajendran | ............. | H04W 48/16 |
| 2024/0162955 A1* | 5/2024 | Whinnett | ............. | H04W 24/10 |
| 2024/0187317 A1* | 6/2024 | Cui | ......................... | H04L 41/40 |
| 2024/0196177 A1* | 6/2024 | Parasher | ................ | H04L 41/22 |
| 2024/0196178 A1* | 6/2024 | Ying | ....................... | H04W 8/18 |
| 2024/0214272 A1* | 6/2024 | Ying | .................. | H04L 41/0873 |
| 2024/0236766 A1* | 7/2024 | Shete | .................. | H04L 41/0894 |
| 2024/0250875 A1* | 7/2024 | Luthra | ............... | H04L 41/0823 |
| 2024/0250878 A1* | 7/2024 | Luthra | ............... | H04L 41/0894 |
| 2024/0250904 A1* | 7/2024 | Shete | ............... | H04W 36/0083 |
| 2024/0251254 A1* | 7/2024 | Luthra | .................. | H04W 24/02 |
| 2024/0251292 A1* | 7/2024 | Forenza | ................ | H04W 24/02 |
| 2024/0259836 A1* | 8/2024 | Shete | .................. | H04B 17/3913 |
| 2024/0259873 A1* | 8/2024 | Shete | .................... | H04W 24/02 |
| 2024/0267752 A1* | 8/2024 | Shete | .................... | H04W 24/02 |
| 2024/0267753 A1* | 8/2024 | Shete | .................... | H04W 24/02 |
| 2024/0276187 A1* | 8/2024 | Shete | .................... | H04W 24/02 |
| 2024/0276188 A1* | 8/2024 | Shete | .................... | G06F 9/4451 |
| 2024/0276580 A1* | 8/2024 | Shete | ................. | H04W 52/028 |
| 2025/0063429 A1* | 2/2025 | Hegde | .............. | H04W 28/0861 |
| 2025/0097285 A1* | 3/2025 | Reddy | ............... | H04L 67/1008 |
| 2025/0097732 A1* | 3/2025 | Hegde | ................. | H04W 24/02 |
| 2025/0133419 A1* | 4/2025 | Shete | .................... | H04W 28/16 |

OTHER PUBLICATIONS

Written Opinion issued Jul. 19, 2023 in Application No. PCT/US2023/017362.

\* cited by examiner

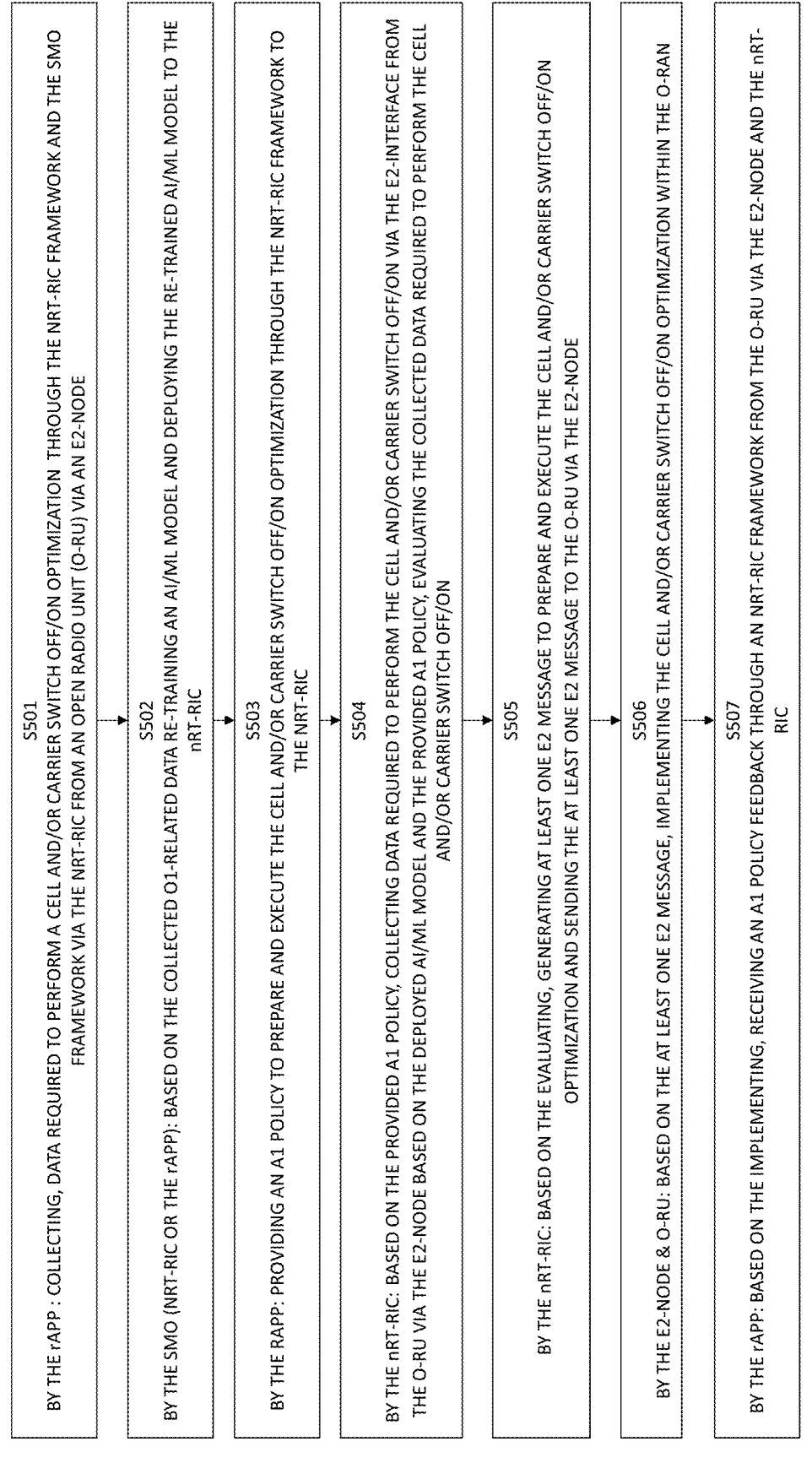

FIG. 5

S501 — BY THE rAPP : COLLECTING, DATA REQUIRED TO PERFORM A CELL AND/OR CARRIER SWITCH OFF/ON OPTIMIZATION THROUGH THE NRT-RIC FRAMEWORK AND THE SMO FRAMEWORK VIA THE NRT-RIC FROM AN OPEN RADIO UNIT (O-RU) VIA AN E2-NODE

S502 — BY THE SMO (NRT-RIC OR THE rAPP): BASED ON THE COLLECTED O1-RELATED DATA RE-TRAINING AN AI/ML MODEL AND DEPLOYING THE RE-TRAINED AI/ML MODEL TO THE nRT-RIC

S503 — BY THE rAPP: PROVIDING AN A1 POLICY TO PREPARE AND EXECUTE THE CELL AND/OR CARRIER SWITCH OFF/ON OPTIMIZATION THROUGH THE NRT-RIC FRAMEWORK TO THE NRT-RIC

S504 — BY THE nRT-RIC: BASED ON THE PROVIDED A1 POLICY, COLLECTING DATA REQUIRED TO PERFORM THE CELL AND/OR CARRIER SWITCH OFF/ON VIA THE E2-INTERFACE FROM THE O-RU VIA THE E2-NODE BASED ON THE DEPLOYED AI/ML MODEL AND THE PROVIDED A1 POLICY, EVALUATING THE COLLECTED DATA REQUIRED TO PERFORM THE CELL AND/OR CARRIER SWITCH OFF/ON

S505 — BY THE nRT-RIC: BASED ON THE EVALUATING, GENERATING AT LEAST ONE E2 MESSAGE TO PREPARE AND EXECUTE THE CELL AND/OR CARRIER SWITCH OFF/ON OPTIMIZATION AND SENDING THE AT LEAST ONE E2 MESSAGE TO THE O-RU VIA THE E2-NODE

S506 — BY THE E2-NODE & O-RU: BASED ON THE AT LEAST ONE E2 MESSAGE, IMPLEMENTING THE CELL AND/OR CARRIER SWITCH OFF/ON OPTIMIZATION WITHIN THE O-RAN

S507 — BY THE rAPP: BASED ON THE IMPLEMENTING, RECEIVING AN A1 POLICY FEEDBACK THROUGH AN NRT-RIC FRAMEWORK FROM THE O-RU VIA THE E2-NODE AND THE nRT-RIC

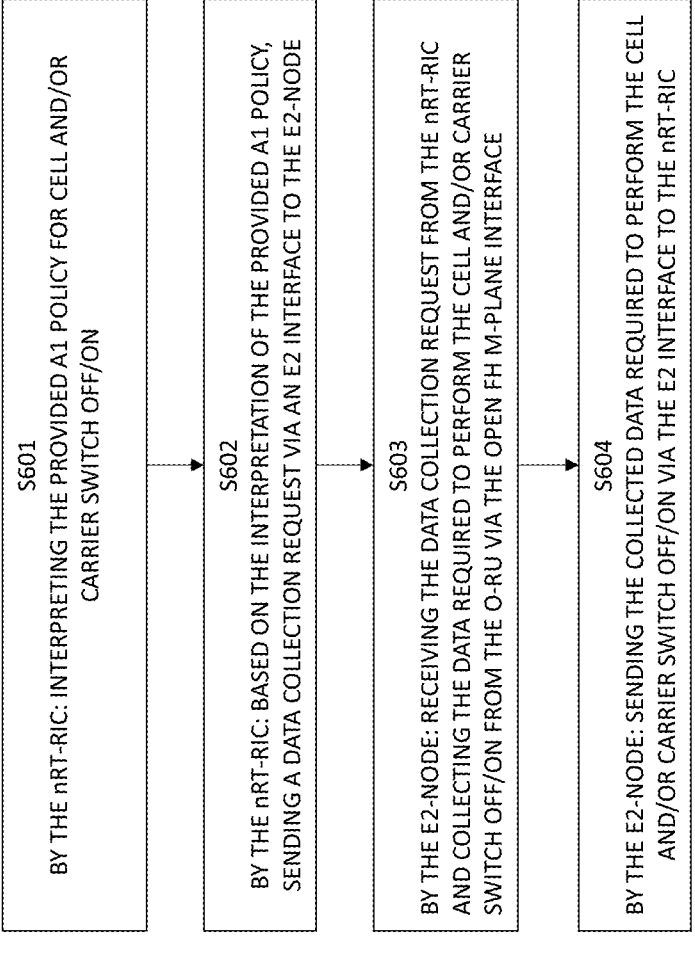

S601
BY THE nRT-RIC: INTERPRETING THE PROVIDED A1 POLICY FOR CELL AND/OR CARRIER SWITCH OFF/ON

S602
BY THE nRT-RIC: BASED ON THE INTERPRETATION OF THE PROVIDED A1 POLICY, SENDING A DATA COLLECTION REQUEST VIA AN E2 INTERFACE TO THE E2-NODE

S603
BY THE E2-NODE: RECEIVING THE DATA COLLECTION REQUEST FROM THE nRT-RIC AND COLLECTING THE DATA REQUIRED TO PERFORM THE CELL AND/OR CARRIER SWITCH OFF/ON FROM THE O-RU VIA THE OPEN FH M-PLANE INTERFACE

S604
BY THE E2-NODE: SENDING THE COLLECTED DATA REQUIRED TO PERFORM THE CELL AND/OR CARRIER SWITCH OFF/ON VIA THE E2 INTERFACE TO THE nRT-RIC

FIG. 6

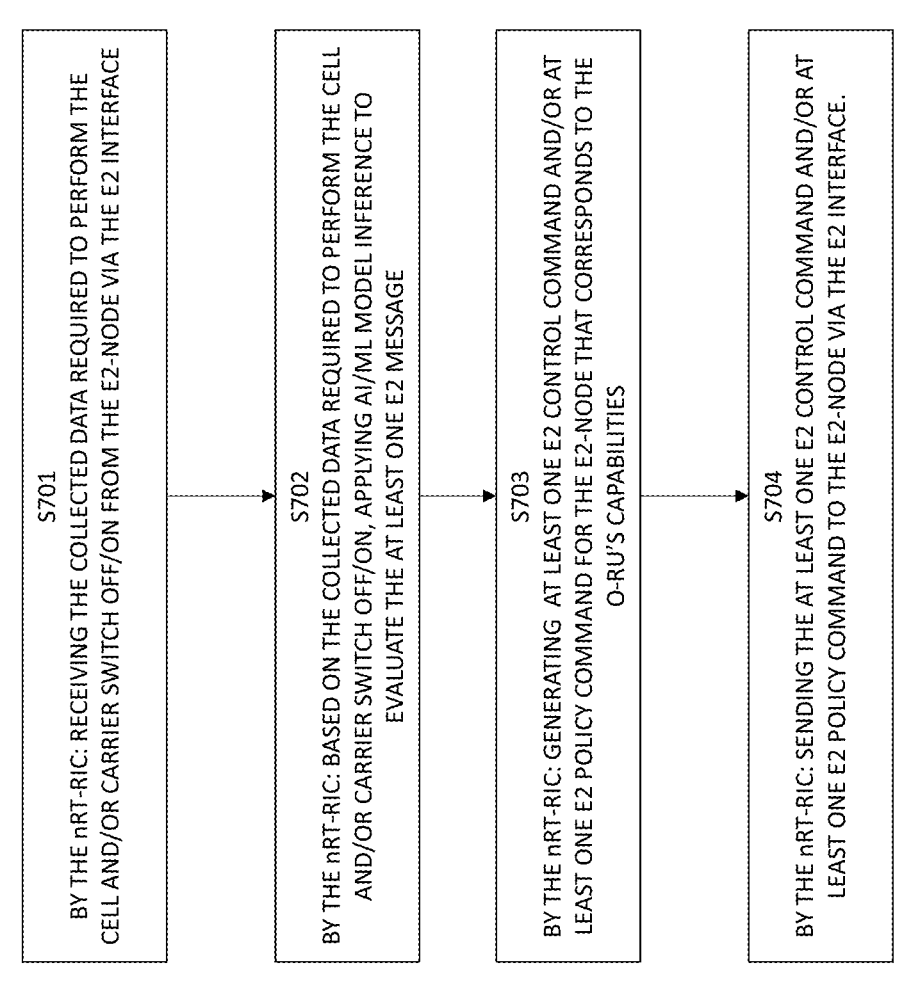

BY THE nRT-RIC: RECEIVING THE COLLECTED DATA REQUIRED TO PERFORM THE CELL AND/OR CARRIER SWITCH OFF/ON FROM THE E2-NODE VIA THE E2 INTERFACE

S702

BY THE nRT-RIC: BASED ON THE COLLECTED DATA REQUIRED TO PERFORM THE CELL AND/OR CARRIER SWITCH OFF/ON, APPLYING AI/ML MODEL INFERENCE TO EVALUATE THE AT LEAST ONE E2 MESSAGE

S703

BY THE nRT-RIC: GENERATING AT LEAST ONE E2 CONTROL COMMAND AND/OR AT LEAST ONE E2 POLICY COMMAND FOR THE E2-NODE THAT CORRESPONDS TO THE O-RU'S CAPABILITIES

S704

BY THE nRT-RIC: SENDING THE AT LEAST ONE E2 CONTROL COMMAND AND/OR AT LEAST ONE E2 POLICY COMMAND TO THE E2-NODE VIA THE E2 INTERFACE.

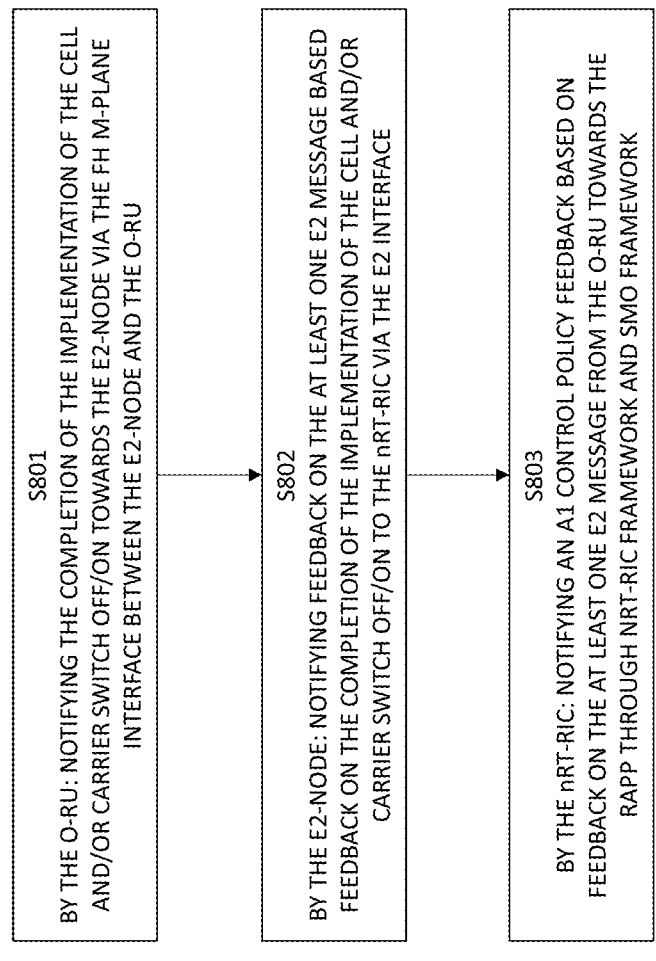

S801

BY THE O-RU: NOTIFYING THE COMPLETION OF THE IMPLEMENTATION OF THE CELL AND/OR CARRIER SWITCH OFF/ON TOWARDS THE E2-NODE VIA THE FH M-PLANE INTERFACE BETWEEN THE E2-NODE AND THE O-RU

S802

BY THE E2-NODE: NOTIFYING FEEDBACK ON THE AT LEAST ONE E2 MESSAGE BASED FEEDBACK ON THE COMPLETION OF THE IMPLEMENTATION OF THE CELL AND/OR CARRIER SWITCH OFF/ON TO THE nRT-RIC VIA THE E2 INTERFACE

S803

BY THE nRT-RIC: NOTIFYING AN A1 CONTROL POLICY FEEDBACK BASED ON FEEDBACK ON THE AT LEAST ONE E2 MESSAGE FROM THE O-RU TOWARDS THE RAPP THROUGH NRT-RIC FRAMEWORK AND SMO FRAMEWORK

FIG. 8

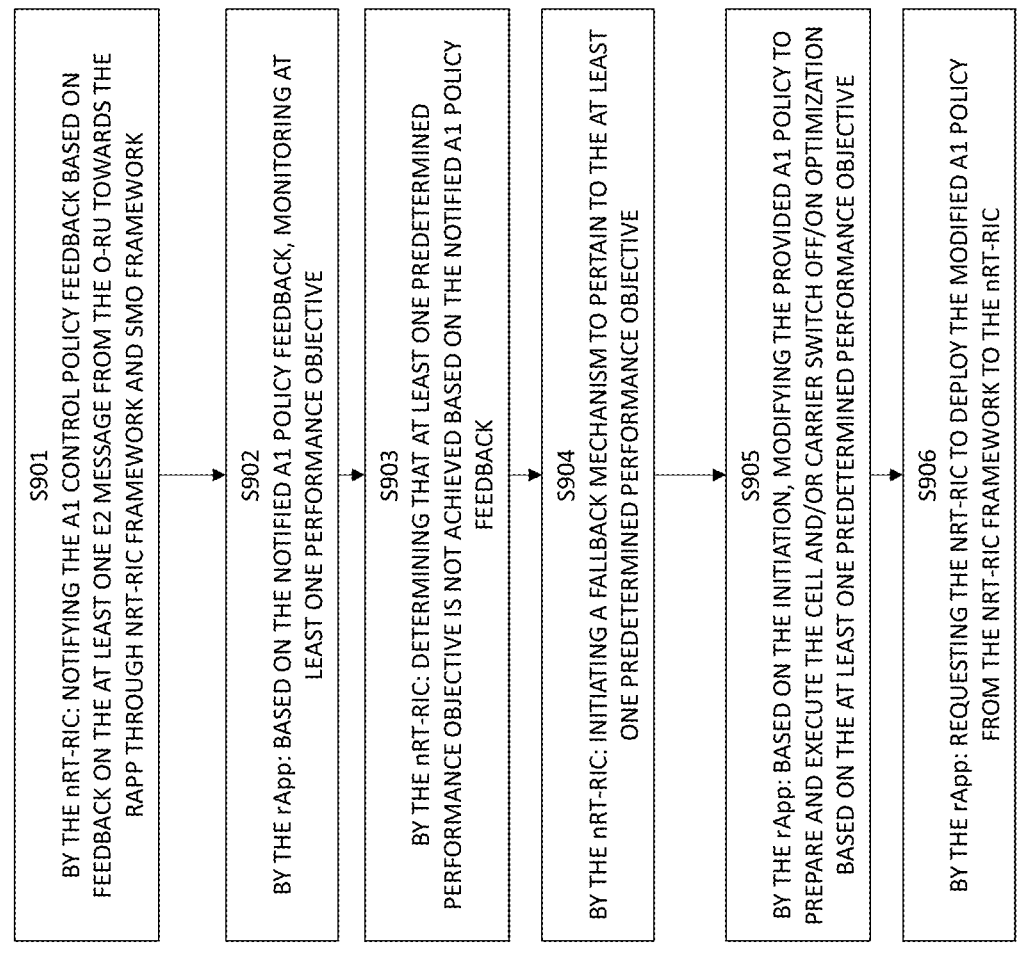

S901

BY THE nRT-RIC: NOTIFYING THE A1 CONTROL POLICY FEEDBACK BASED ON FEEDBACK ON THE AT LEAST ONE E2 MESSAGE FROM THE O-RU TOWARDS THE RAPP THROUGH nRT-RIC FRAMEWORK AND SMO FRAMEWORK

S902

BY THE rApp: BASED ON THE NOTIFIED A1 POLICY FEEDBACK, MONITORING AT LEAST ONE PERFORMANCE OBJECTIVE

S903

BY THE nRT-RIC: DETERMINING THAT AT LEAST ONE PREDETERMINED PERFORMANCE OBJECTIVE IS NOT ACHIEVED BASED ON THE NOTIFIED A1 POLICY FEEDBACK

S904

BY THE nRT-RIC: INITIATING A FALLBACK MECHANISM TO PERTAIN TO THE AT LEAST ONE PREDETERMINED PERFORMANCE OBJECTIVE

S905

BY THE rApp: BASED ON THE INITIATION, MODIFYING THE PROVIDED A1 POLICY TO PREPARE AND EXECUTE THE CELL AND/OR CARRIER SWITCH OFF/ON OPTIMIZATION BASED ON THE AT LEAST ONE PREDETERMINED PERFORMANCE OBJECTIVE

S906

BY THE rApp: REQUESTING THE NRT-RIC TO DEPLOY THE MODIFIED A1 POLICY FROM THE NRT-RIC FRAMEWORK TO THE nRT-RIC

FIG. 9

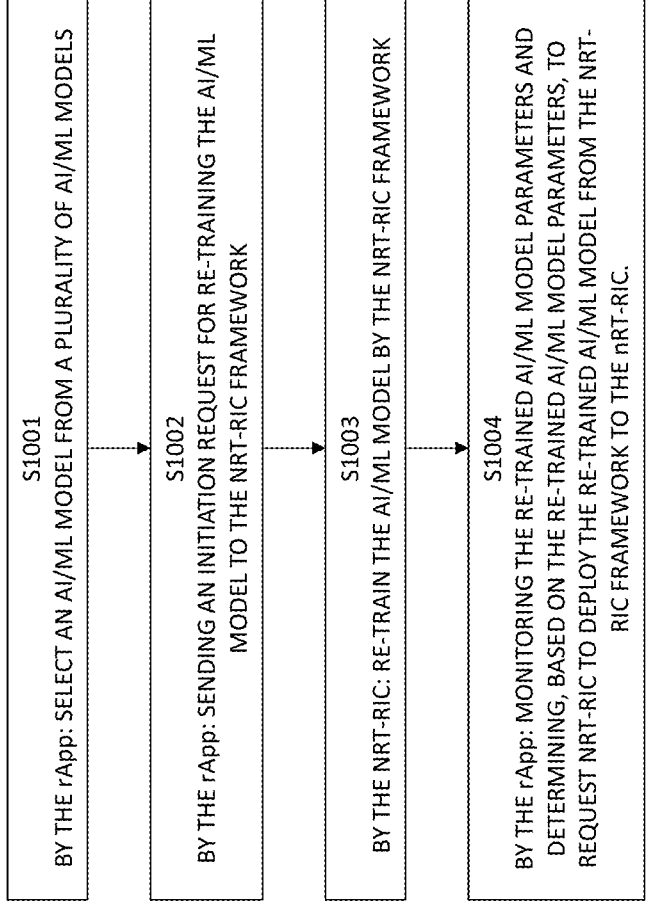

S1001
BY THE rApp: SELECT AN AI/ML MODEL FROM A PLURALITY OF AI/ML MODELS

S1002
BY THE rApp: SENDING AN INITIATION REQUEST FOR RE-TRAINING THE AI/ML MODEL TO THE NRT-RIC FRAMEWORK

S1003
BY THE NRT-RIC: RE-TRAIN THE AI/ML MODEL BY THE NRT-RIC FRAMEWORK

S1004
BY THE rApp: MONITORING THE RE-TRAINED AI/ML MODEL PARAMETERS AND DETERMINING, BASED ON THE RE-TRAINED AI/ML MODEL PARAMETERS, TO REQUEST NRT-RIC TO DEPLOY THE RE-TRAINED AI/ML MODEL FROM THE NRT-RIC FRAMEWORK TO THE nRT-RIC.

FIG. 10

SYSTEM AND METHOD FOR CARRIER AND/OR CELL SWITCH OFF/ON OPTIMIZATION BASED ON AN A1 POLICY IN A TELECOMMUNICATIONS NETWORK

CROSS REFERENCE TO RELATED APPLICATIONS

This application is a National Stage of International Application No. PCT/US2023/017362 filed Apr. 4, 2023.

TECHNICAL FIELD

Systems and methods consistent with example embodiments of the present disclosure relate to the implementation of carrier and/or cell switch off/on optimization based on an A1 policy in a telecommunications network.

BACKGROUND

A radio access network (RAN) is an important component in a telecommunications system, as it connects end-user devices (or user equipment) to other parts of the network. The RAN includes a combination of various network elements (NEs) that connect the end-user devices to a core network. Traditionally, hardware and/or software of a particular RAN is vendor specific.

Open RAN (O-RAN) technology has emerged to enable multiple vendors to provide hardware and/or software to a telecommunications system. To this end, O-RAN disaggregates the RAN functions into a centralized unit (CU), a distributed unit (DU), and a radio unit (RU). The CU is a logical node for hosting Radio Resource Control (RRC), Service Data Adaptation Protocol (SDAP), and/or Packet Data Convergence Protocol (PDCP) sublayers of the RAN. The DU is a logical node hosting Radio Link Control (RLC), Media Access Control (MAC), and Physical (PHY) sublayers of the RAN. The RU is a physical node that converts radio signals from antennas to digital signals that can be transmitted over the FrontHaul (FH) to a DU. Because these entities have open protocols and interfaces between them, they can be developed by different vendors.

FIG. 1 illustrates a related art O-RAN architecture. Referring to FIG. 1, RAN functions in the O-RAN architecture are controlled and optimized by a RIC. The RIC is a software-defined component that implements modular applications to facilitate the multivendor operability required in the O-RAN system. The RIC also automates and optimizes RAN operations. The RIC is divided into two types: a non-real-time RIC (NRT-RIC) and a near-real-time RIC (nRT-RIC).

The NRT-RIC is the control point of a non-real-time control loop and operates on a timescale greater than 1 second within the Service Management and Orchestration (SMO) framework. Its functionalities are implemented through modular applications called rApps (rApp 1, . . . , rApp N), and include: providing policy-based guidance and enrichment across the A1 interface, which is the interface that enables communication between the NRT-RIC and the nRT-RIC; performing data analytics; Artificial Intelligence/Machine Learning (AI/ML) training and inference for RAN optimization; and/or recommending configuration management actions over the O1 interface, which is the interface that connects the SMO to RAN managed elements (e.g., nRT-RIC, O-RAN Centralized Unit (O-CU), O-RAN Distributed Unit (O-DU), etc.).

The nRT-RIC operates on a timescale between 10 milliseconds and 1 second and connects to the O-DU, O-CU (disaggregated into the O-CU control plane (O-CU-CP) and the O-CU user plane (O-CU-UP)), and an open evolved NodeB (O-eNB) via the E2 interface. The nRT-RIC uses the E2 interface to control the underlying RAN elements (E2 nodes/network functions (NFs)) over a near-real-time control loop. The nRT-RIC monitors, suspends/stops, overrides, and controls the E2 node(s) (O-CU, O-DU, and O-eNB) via policies. For example, the nRT-RIC sets policy parameters on activated functions of the E2 nodes. Further, the nRT-RIC hosts xApps to implement functions such as quality of service (QoS) optimization, mobility optimization, slicing optimization, interference mitigation, load balancing, security, etc. The two types of RICs work together to optimize the O-RAN. For example, the NRT-RIC provides, over the A1 interface, the policies, data, and artificial intelligence/machine learning AI/ML models enforced and used by the nRT-RIC for RAN optimization, and the nRT-RIC returns policy feedback (i.e., how the policy set by the NRT-RIC works).

The SMO framework, within which the NRT-RIC is located, manages and orchestrates RAN elements. Specifically, the SMO manages and orchestrates what is referred to as the O-Ran Cloud (O-Cloud). The O-Cloud is a collection of physical RAN nodes that host the RICs, O-CUs, and O-DUs, the supporting software components (e.g., the operating systems and runtime environments), and the SMO itself. In other words, the SMO manages the O-Cloud from within. The O2 interface is the interface between the SMO and the O-Cloud it resides in. Through the O2 interface, the SMO provides infrastructure management services (IMS) and deployment management services (DMS).

The O-Cloud, on the other hand, is a cloud computing platform comprising a collection of physical infrastructure nodes that meet O-RAN requirements to host the relevant O-RAN functions (e.g., nRT-RIC, O-CU-CP, O-CU-UP, O-DU, etc.), the supporting software components (such as Operating System, Virtual Machine Monitor, Container Runtime, etc.) and the appropriate management and orchestration functions.

The SMO framework, within which the NRT-RIC is located, manages and orchestrates RAN elements. The SMO performs management and orchestration of RAN elements through four key interfaces: the A1 Interface between the NRT-RIC in the SMO and the nRT-RIC for RAN Optimization; the O1 Interface between the SMO and the O-RAN Network Functions for FCAPS support; in the case of a hybrid model, an Open Fronthaul M-plane interface between SMO and O-RU for FCAPS support; the O2 Interface between the SMO and the O-Cloud to platform resources and workload management.

In the related art, the O-RAN utilizes multiple frequency layers (carriers) to cover the same service area. At a low network traffic load (e.g., when the expected traffic volume is lower than a fixed threshold), energy saving (i.e., high energy efficiency and/or low energy consumption) can be achieved by shutting down (i.e., switching off) one or more carriers or entire cells without impairing O-RAN user experience. In case of a shutdown (i.e., switching off) of one or more carriers or entire cells, O-RAN users (i.e., the user equipment (UE) connected to the O-RAN) previously served by the one or more carriers or the cells will be offloaded by an E2 node to one or more new target carriers or to cells prior to the shutdown (i.e., switch off).

In view of the local or network-wide impact of a shutdown in the O-RAN, there is a trade-off between system performance and energy conservation. This trade-off makes decisions about switching off or switching on a non-trivial task. For example, other carriers and/or cells may have to cover (i.e., to take over or serve) additional network traffic, wherein network traffic is changing over time. Moreover, E2 node(s) may have to support several techniques affecting energy consumption which might also be load (e.g., network traffic or user number) dependent.

As a result, while conserving energy for the switched-off one or more carriers and/or entire cells is maximized on a local basis, the overall network energy consumption of the O-RAN might even increase. In this case, the local deployment of energy-saving optimization measures based on carrier and/or cell switch off/on leads to an inferior overall network energy efficiency and/or energy consumption of the O-RAN.

SUMMARY

According to embodiments, systems and methods are provided that allow an O-RAN operator to flexibly configure carrier and cell switch off/on parameters in a cell or in a cluster of cells (e.g., data required to perform cell and/or carrier switch off/on) based on A1 policies formulated by a rApp. In particular, the systems and methods allow for an evaluation (A1 policy interpretation and AI/ML model inference) of the data required to perform cell and/or carrier switch off/on (i.e., using AI/ML Model Inference) at the nRT-RIC while the AI/ML model training is hosted in the SMO (e.g., in the NRT-RIC or in the rApp).

For example, systems and methods allow a network operator to flexibly configure carrier and/or cell switch off/on parameters in a cell or in a cluster of cells to optimize the energy efficiency management in the O-RAN based on the A1 policies formulated by a rApp.

According to embodiments, a system for implementing a carrier and/or cell switch off/on optimization in an open radio access network (O-RAN) based on an A1 policy, the system includes: a memory storing instructions; and at least one processor configured to implement a service management and orchestration (SMO) framework, a near-real-time radio intelligent controller (nRT-RIC), a non-real-time radio intelligent controller (NRT-RIC), a NRT-RIC framework and a rApp, the at least one processor configured to execute the instructions to: collect, by the rApp, data required to perform a cell and/or carrier switch off/on optimization through the NRT-RIC framework and/or the SMO framework via the nRT-RIC from an open radio unit (O-RU); based on the collected optimization data, by the SMO, re-train at least one artificial intelligence/machine learning (AI/ML) model and, among the at least one re-trained AI/ML, deploy, by the NRT-RIC framework, one re-trained AI/ML model to the nRT-RIC; provide, by the rApp, an A1 policy to prepare and execute the cell and/or carrier switch off/on optimization through the NRT-RIC framework to the nRT-RIC; based on the provided A1 policy, by the nRT-RIC, collect data required to perform the cell and/or carrier switch off/on via the E2-interface from the O-RU via the E2 node; based on the deployed AI/ML model and the provided A1 policy, evaluate, by nRT-RIC, the collected data required to perform the cell and/or carrier switch off/on; based on the evaluating, generate, by the nRT-RIC, at least one E2 message to prepare and execute the cell and/or carrier switch off/on optimization and send, by the nRT-RIC, the at least one E2 message to the O-RU via the E2 node; based on the at least one E2 message, implement, by the E2 node and the O-RU, the cell and/or carrier switch off/on optimization within the O-RAN; based on the implementing, receive, by the rApp, an A1 policy feedback through an NRT-RIC framework from the O-RU via the E2 node and the nRT-RIC.

According to embodiments, a method for implementing a carrier and/or cell switch off/on optimization in an open radio access network (O-RAN) based on an A1 policy, the method includes: collecting, by a rApp, data required to perform a cell and/or carrier switch off/on optimization through the NRT-RIC framework and/or the SMO framework via the nRT-RIC from an open radio unit (O-RU) via an E2 node; based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC; providing, by a rApp, an A1 policy to prepare and execute the cell and/or carrier switch off/on optimization through the NRT-RIC framework to the nRT-RIC; based on the provided A1 policy, by the nRT-RIC, collecting data required to perform the cell and/or carrier switch off/on via the E2-interface from the O-RU via the E2 node; based on the deployed AI/ML model and the provided A1 policy, evaluating, by nRT-RIC, the collected data required to perform the cell and/or carrier switch off/on; based on the evaluating, generating, by the nRT-RIC, at least one E2 message to prepare and execute the cell and/or carrier switch off/on optimization and sending, by the nRT-RIC, the at least one E2 message to the O-RU via the E2 node; based on the at least one E2 message, implementing, by the E2 node and the O-RU, the cell and/or carrier switch off/on optimization within the O-RAN; based on the implementing, receiving, by the rApp, an A1 policy feedback through an NRT-RIC framework from the O-RU via the E2 node and the nRT-RIC.

According to embodiments, a non-transitory computer-readable recording medium having recorded thereon instructions executable by at least one processor, the at least one processor further configured to perform a method for implementing a carrier and/or cell switch off/on optimization in an open radio access network (O-RAN) based on an A1 policy, the method includes: collecting, by a rApp, data required to perform a cell and/or carrier switch off/on optimization through the NRT-RIC framework and/or the SMO framework via the nRT-RIC from an open radio unit (O-RU) via an E2 node; based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC; providing, by a rApp, an A1 policy to prepare and execute the cell and/or carrier switch off/on optimization through the NRT-RIC framework to the nRT-RIC; based on the provided A1 policy, by the nRT-RIC, collecting data required to perform the cell and/or carrier switch off/on via the E2-interface from the O-RU via the E2 node; based on the deployed AI/ML model and the provided A1 policy, evaluating, by nRT-RIC, the collected data required to perform the cell and/or carrier switch off/on; based on the evaluating, generating, by the nRT-RIC, at least one E2 message to prepare and execute the cell and/or carrier switch off/on optimization and sending, by the nRT-RIC, the at least one E2 message to the O-RU via the E2 node; based on the at least one E2 message, implementing, by the E2 node and the O-RU, the cell and/or carrier switch off/on optimization within the O-RAN; based on the implementing, receiving, by the rApp, an A1 policy feedback through an NRT-RIC framework from the O-RU via the E2 node and the nRT-RIC.

Additional aspects will be set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein:

FIG. 5 illustrates a flow diagram of a method for implementing a carrier and/or cell switch off/on optimization based on an A1 policy according to an embodiment;

FIG. 6 illustrates a flow diagram of a method for implementing a carrier and/or cell switch off/on optimization based on an A1 policy according to another embodiment;

FIG. 7 illustrates a flow diagram of a method for implementing a carrier and/or cell switch off/on optimization based on an A1 policy according to another embodiment;

FIG. 8 illustrates a flow diagram of a method for implementing a carrier and/or cell switch off/on optimization based on an A1 policy according to another embodiment;

FIG. 9 illustrates a flow diagram of a method for implementing a carrier and/or cell switch off/on optimization based on an A1 policy according to another embodiment;

FIG. 10 illustrates a flow diagram of a method for implementing a carrier and/or cell switch off/on optimization based on an A1 policy according to another embodiment;

DETAILED DESCRIPTION

The following detailed description of example embodiments refers to the accompanying drawings. The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Figure 1:
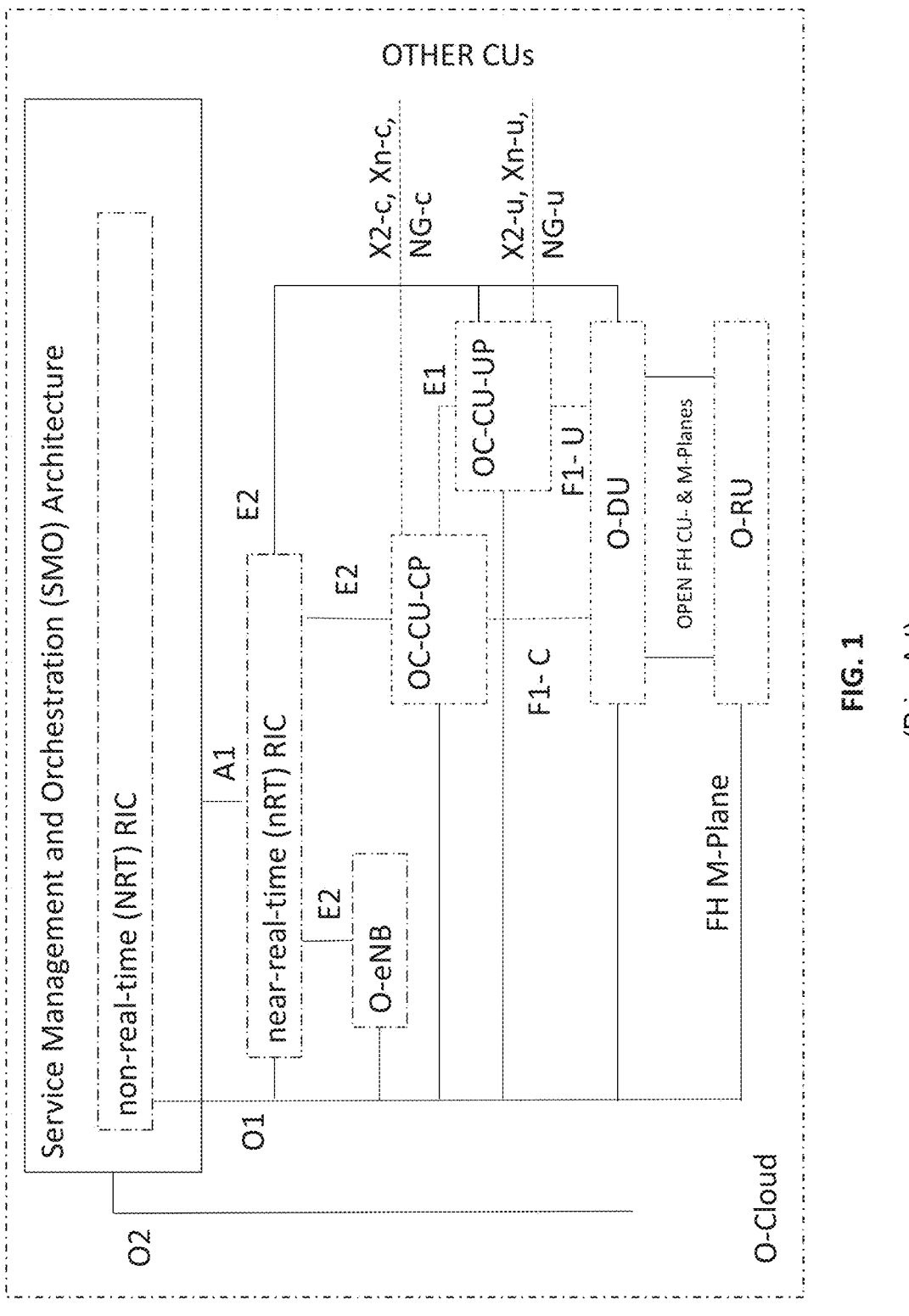
FIG. 1 illustrates an O-RAN architecture in the related art.
Figure 2:
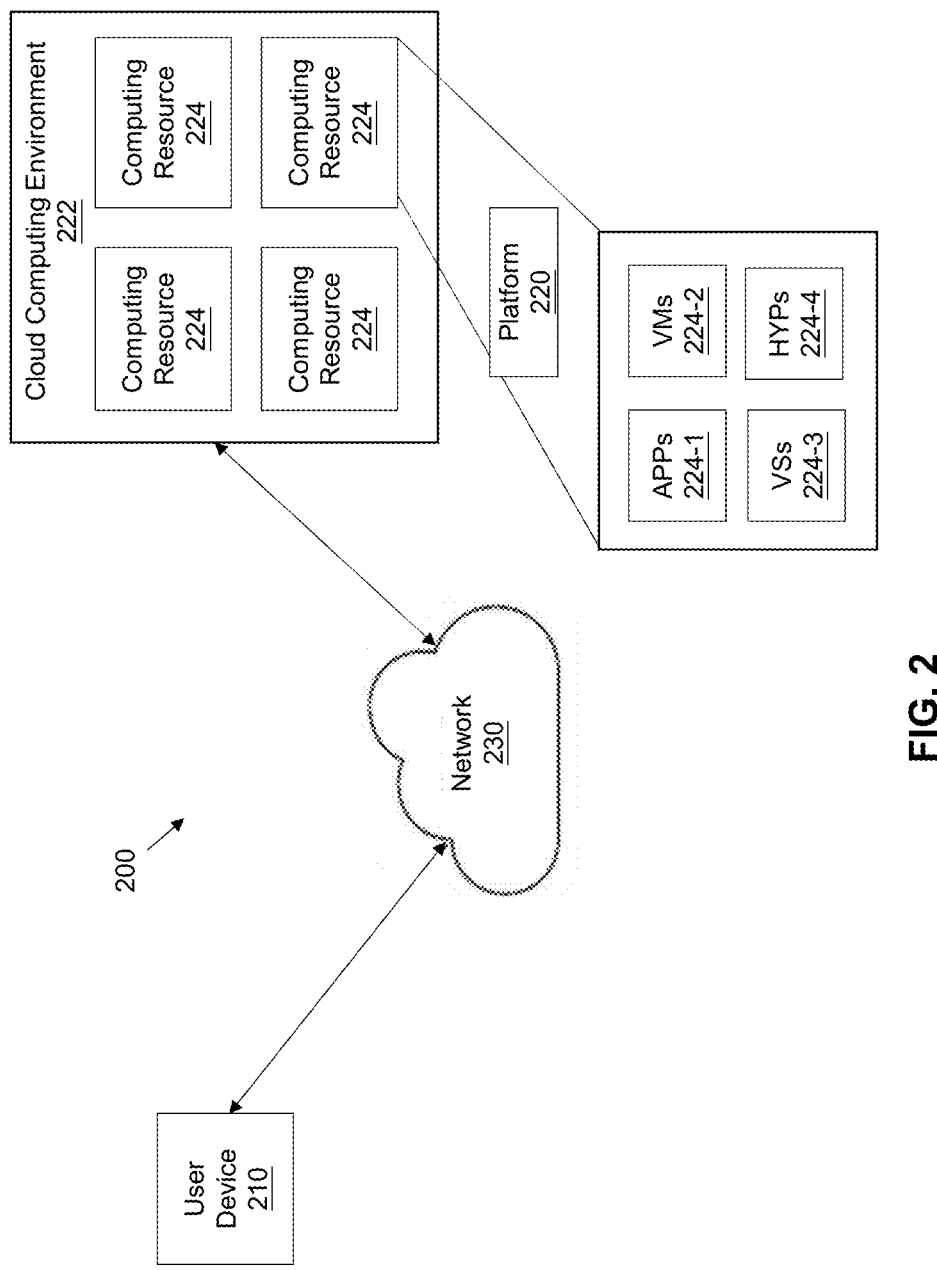
FIG. 2 illustrates a diagram of an example environment in which systems and/or methods, described herein, may be implemented.

FIG. 2 illustrates a diagram of an example environment 200 in which systems and/or methods, described herein, may be implemented. As shown in FIG. 2, environment 200 may include a user device 210, a platform 220, and a network 230. Devices of environment 200 may interconnect via wired connections, wireless connections, or a combination of wired and wireless connections. In embodiments, any of the functions and operations described with reference to FIG. 1 above may be performed by any combination of elements illustrated in FIG. 2.

User device 210 includes one or more devices capable of receiving, generating, storing, processing, and/or providing information associated with platform 220. For example, user device 210 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 210 may receive information from and/or transmit information to platform 220.

Platform 220 includes one or more devices capable of receiving, generating, storing, processing, and/or providing information. In some implementations, platform 220 may include a cloud server or a group of cloud servers. In some implementations, platform 220 may be designed to be modular such that certain software components may be swapped in or out depending on a particular need. As such, platform 220 may be easily and/or quickly reconfigured for different uses.

In some implementations, as shown, platform 220 may be hosted in cloud computing environment 222. Notably, while implementations described herein describe platform 220 as being hosted in cloud computing environment 222, in some implementations, platform 220 may not be cloud-based (i.e., may be implemented outside of a cloud computing environment) or may be partially cloud-based.

Cloud computing environment 222 includes an environment that hosts platform 220. Cloud computing environment 222 may provide computation, software, data access, storage, etc., services that do not require end-user (e.g., user device 210) knowledge of a physical location and configuration of system(s) and/or device(s) that hosts platform 220. As shown, cloud computing environment 222 may include a group of computing resources 224 (referred to collectively as "computing resources 224" and individually as "computing resource 224").

Computing resource 224 includes one or more personal computers, a cluster of computing devices, workstation computers, server devices, or other types of computation and/or communication devices. In some implementations, computing resource 224 may host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by user device 210. Application 224-1 may eliminate the need to install and execute the software applications on user device 210. For example, application 224-1 may include software associated with platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports the execution of a complete operating system ("OS"). A process virtual machine may execute a single program, and may support a single process. In some implementations, virtual machine 224-2 may execute on behalf of a user (e.g., user device 210), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
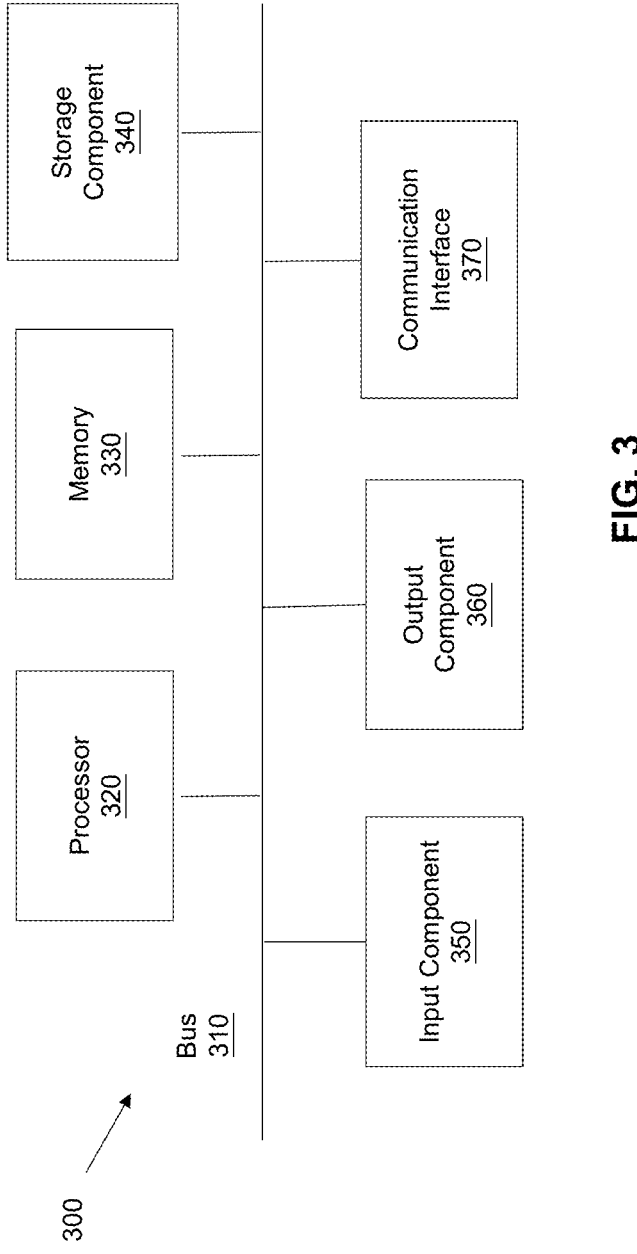
FIG. 3 illustrates a diagram of example components of a device according to an embodiment.

FIG. 3 illustrates a diagram of example components of a device 300. Device 300 may correspond to user device 210 and/or platform 220. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 may be implemented in hardware, firmware, or a combination of hardware and software. Processor 320 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read-only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive. Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software. The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

In embodiments, any one of the operations or processes of FIGS. 4, 5, 6, 7 and 8 may be implemented by or using any one of the elements illustrated in FIGS. 1, 2 and 3. It is understood that other embodiments are not limited thereto, and may be implemented in a variety of different architectures (e.g., bare metal architecture, any cloud-based architecture or deployment architecture such as Kubernetes, Docker, OpenStack, etc.).

Figure 4:
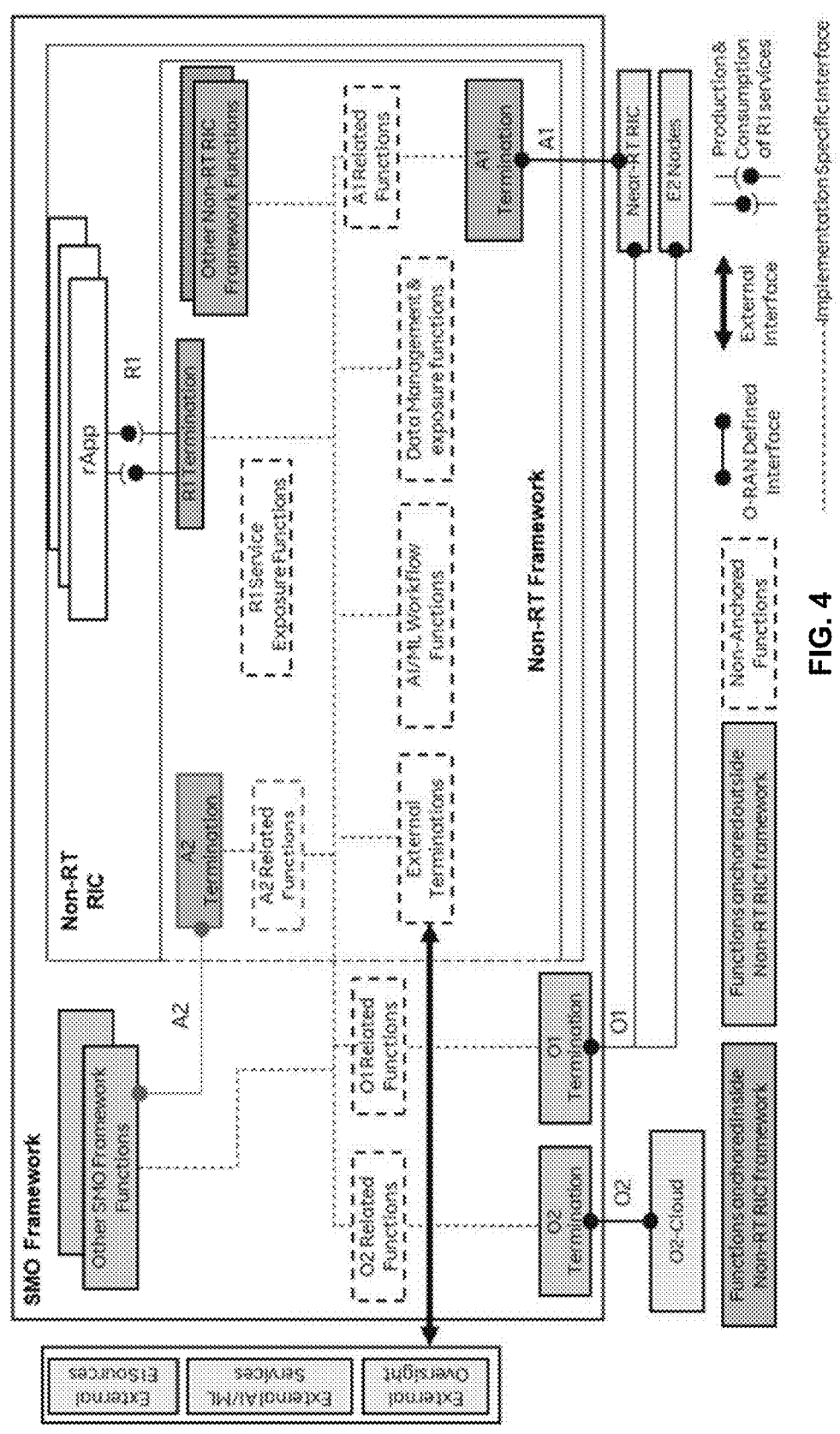
FIG. 4 illustrates the SMO/NRT-RIC framework system architecture configured to implement the optimization of a carrier and/or cell switch off/on based on an A1 policy according to an embodiment.

FIG. 4 illustrates the SMO/NRT-RIC framework system architecture configured to implement the optimization of a carrier and/or cell switch off/on based on an A1 policy according to an embodiment.

Referring to FIG. 4, the NRT-RIC represents a subset of functionalities of the SMO framework. The NRT-RIC can access other SMO framework functionalities and thereby influence (i.e., controls and/or executes) what is carried across the O1 and O2 interface (e.g., performing configuration management (CM) and/or performance management (PM)).

The SMO framework system architecture includes SMO functions that include an O1 termination that enables communication between the SMO framework and E2 node(s) (i.e., O-CU, O-DU, etc.) via the O1 interface.

The NRT-RIC includes an NRT-RIC framework. The NRT-RIC framework, among a plurality of other functions, includes R1 service exposure functions that handle R1 services provided in accordance with example embodiments. In general, the NRT-RIC functions within the NRT-RIC framework support the authorization, authentication, registration, discovery, communication support, etc., for the rApps.

In general, R1 services may include a collection of services including, but not limited to, service registration and discovery services, authentication and authorization services, AI/ML workflow services, and A1, O1 and O2 interface related services.

NRT-RIC Applications (rApps) are applications that leverage the functionalities available in the NRT-RIC framework and/or SMO framework to provide value-added services related to RAN operation and optimization. The scope of rApps includes, but is not limited to, radio resource management, data analytics, etc., and enrichment of information. In general, a rApp refers to an application designed to consume and/or produce R1 services.

To this end, the NRT-RIC framework produces and/or consumes R1 services according to example embodiments via an R1 interface. The R1 interface terminates in an R1 termination of the NRT-RIC framework. The R1 termination connects to the NRT-RIC framework and the rApps via the R1 interface and enables the NRT-RIC framework and rApps to exchange messages/data (i.e., requests and responses comprising of data models) to access the R1 services via the R1 interface.

In general, the R1 interface is defined as an interface between rApps and the NRT-RIC framework via which R1 services can be produced and consumed.

Moreover, the NRT-RIC framework comprises A1-related functions. The A1-related functions of the NRT-RIC framework support, for example, A1 logical termination, A1-policy coordination and catalog, A1-EI coordination and catalog, etc.

In particular, NRT-RIC framework and the A1-related functions therein provide the A1 policy (i.e., a set of rules that are used to manage and control the changing and/or maintaining of the state of one or more managed objects) based on guidance and enrichment across the A1 interface, which is the interface that enables the communication between the NRT-RIC and the nRT-RIC (i.e., an A1 policy that is, according to the related art, a type of declarative policies expressed using formal statements that enable the NRT-RIC within the SMO to guide the nRT-RIC, and hence the RAN, towards better fulfillment of the RAN intent (e.g., predetermined performance objectives)).

The data management and exposure services within the NRT-RIC framework deliver data created or collected by data producers to data consumers according to their needs (e.g., function management (FM)/consumption management (CM)/production management (PM) data to rApps or CM changes from rApps to the O-RAN via the O1 interface.

The NRT-RIC framework further comprises External Terminations. The External Terminations, for example, support an exchange of data between the NRT-RIC framework and external AI/ML functions, Enrichment Information (EI) Sources, or an External Oversight.

Within the NRT-RIC framework, the AI/ML workflow services provide access to AI/ML workflow. For example, the AI/ML workflow services may assist in training models, monitoring, etc. the deployed AI/ML models in NRT-RIC. As a result, The NRT-RIC framework and AI/ML workflow services therein enable artificial intelligence and machine learning (AI/ML) training and inference for RAN optimization.

Moreover, the NRT-RIC framework comprises A2-related functions that support, for example, A2 logical termination, A2-Policy coordination and catalog, etc.

Referring to FIG. 4, the NRT-RIC framework (e.g., the at least one rApp hosted by the NRT-RIC and/or the NRT-RIC framework) allows for a flexible configuration of the carrier and/or cell switch off/on parameters in a cell or in a cluster of cells by providing A1 policies over an A1 interface that are formulated by NRT-RIC (e.g., by the at least one rApp hosted by the NRT-RIC and/or the NRT-RIC framework assisted by machine learning (ML) techniques) towards nRT-RIC, wherein the nRT-RIC via E2 interface actions may enforce the deployment of the configured carrier and/or cell switch off/on parameters towards the one more E2 nodes.

To this end, before shutting down (i.e., switching off) one or more carriers and/or cells, the E2 node may need to perform preparation actions for shutting down (i.e., switching off) the one or more carriers and/or cells (e.g., the E2 node may check ongoing emergency calls and/or warning messages, to engage (e.g., enable, disable, modify, etc.), for example, in carrier aggregation and/or dual connectivity, to trigger high occupancy (HO) data traffic and user entities (UEs) from one more cells and/or carriers to other cells or carriers, informing neighboring nodes via the X2/Xn interface, etc.).

Moreover, before switching on one or more carriers and/or cells, the E2 node may need to perform preparation actions for switching on (e.g., the E2 node may perform cell probing, informing neighboring nodes via the X2/Xn interface, etc.).

Referring to FIG. 4, the SMO and NRT-RIC framework are configured to collect data required to perform a cell and/or carrier switch off/on optimization For example, configurations, performance indicators and measurement reports (e.g., cell load-related information and traffic information, energy efficiency EE and/or energy consumption EC measurement reports, geolocation information, etc.) from the E2 node(s) (i.e., O-CU, O-DU, etc.) and the O-RUs (via the E2 node(s)).

The collected data required to perform a cell and/or carrier switch off/on optimization from the E2 node(s) (i.e., O-CU, O-DU, etc.) may include related information for the corresponding O-RU(s), wherein the configurations, performance indicators and measurement reports (e.g., cell load-related information and traffic information, energy efficiency EE and/or energy consumption EC measurement reports, geolocation information, etc.) enable the identification the individual capabilities of the O-RU(s) (e.g., the O-RU's internal system architecture, the performance thereof, the functionality thereof, etc. to optimally manage the O-RU and/or its RF transceiver chains).

The collected data may be used for the purpose of training (re-training) and inference of AI/ML models that assist EE/ES functions for optimizing energy efficiency EE and/or energy consumption EC towards the nRT-RIC through the SMO/NRT-RIC framework assisted by machine learning (ML) techniques.

As set for the above, it hereby assumed that configurations, performance indicators and measurement reports (i.e., the data required to perform a cell and/or carrier switch off/on optimization) collected from the E2 node (e.g., the O-DU) contain the related information for the corresponding O-RU(s).

According to an example embodiment, the collected data as set forth above may be collected via an O1-interface from the E2 node and/or directly from the O-RU.

According to another example embodiment, the collected data as set forth above may be collected via an E2-interface from the O-R via an open FH M-Plane.

In general, Energy Efficiency EE is defined as the relation between the useful output and energy/power consumption, and Energy Consumption EC is defined as an integral of power consumption over time.

In particular, the SMO and NRT-RIC framework are configured (e.g., the SMO and NRT-RIC framework may comprise R1/O1 and/or R1/A1 consumer and/or production services) to formulate an A1 policy (e.g., provides optimization triggers, optimization targets and intent-based policies (e.g., energy savings intents such as a setting an energy target to 50% of peak power consumption) and to provide the A1 policy to the nRT-RIC (e.g., via the A1 interface).

In addition, the SMO and NRT-RIC framework may be configured to train (re-train), update and configure EE/ES AI/ML models in the NRT-RIC.

In an example embodiment, the SMO and NRT-RIC framework (e.g., the at least one rApp hosted by the NRT-RIC and/or the NRT-RIC framework) may be configured to trigger EE/ES AI/ML model training and/or retraining in the NRT-RIC.

Furthermore, in an example embodiment, the SMO and NRT-RIC may be configured to deploy, update, configure, etc., the energy efficiency EE/energy saving ES AI/ML models in the NRT-RIC (e.g., the SMO and NRT-RIC framework may comprise R1/O1 and/or R1/A1 consumer and/or production services to deploy, update, configure, etc., the EE/ES AI/ML models).

Referring to FIG. 4, one or more rApps hosted in the NRT-RIC framework may be configured to collect data required to perform a cell and/or carrier switch off/on optimization through the NRT-RIC framework and the SMO framework via the nRT-RIC from an open radio unit (O-RU) via an E2 node. For example, to collect configurations, performance indicators, measurement reports (i.e., EE/EC measurement reports), etc. from the E2 node(s) and the O-Rus for the purpose of training and execution of relevant AI/ML models (e.g., EE/ES AI/ML models) and for the purpose of monitoring at least one performance objective. (e.g., the performance of the EE/ES AI/ML models regarding the objectives) based on the A1 control feedback provided via the nRT-RIC to the E2 node(s) and O-RUs.

Furthermore, the rApps hosted by the NRT-RIC may be configured to perform actions (i.e., consume and/or produce services via the R1 interface) required for EE/ES optimization (e.g., the rApp via the R1/O1 interface may check ongoing emergency calls and warning messages, perform some preparation actions for shutting down (i.e., switching off) to one or more carriers and/or cells). In an example embodiment, the rApp may be configured to enable, disable, modify, etc., carrier aggregation and/or dual connectivity, to trigger HO traffic and UEs from one or more cells and/or carriers to other cells or carriers, informing neighboring nodes via the X2/Xn interface, etc.).

In another example embodiment, one or more rApps hosted by the NRT-RIC may be configured to perform actions (i.e., consume and/or produce services via the R1 interface) required for EE/ES optimization to prepare for switching on one or more carriers and/or cells. (e.g., one or more rApps hosted by the NRT-RIC may be configured to perform cell probing, informing neighboring nodes via the X2/Xn interface, etc.).

Furthermore, the rApps hosted by the NRT-RIC may be configured (e.g., may comprise R1/O1 consumer and/or production services and/or R1/A1 consumer and/or production services) to initiate fallback measures such as, for example, to train (re-train), update, configure, etc. EE/ES AI/ML models.

Furthermore, one or more rApps hosted by the NRT-RIC may be configured to apply AI/ML model inference to formulate optimized at least one A1 policy for EE/ES based on the data collected using the R1 interface (e.g., modify, update, delete an optimized A1 policy for EE/ES that does not meet the performance objective with regard to the O-RAN optimization intent).

To this end, the one or more E2 node(s) (i.e., O-DUs, O-CUs, etc.) of FIG. 1 are configured to report, for example, cell configuration, performance indicators, measurement reports (e.g., cell load-related information, traffic information, EE/EC measurement reports, etc.), etc. to the SMO via the O1, O2, A1 interface, wherein SMO functions, such as the O1, O2 termination and/or the A1 termination of the NRT-RIC framework, enable the SMO, the NRT-RIC and the rApp to communicate with the E2 nodes (e.g., the O-DU).

Still referring to FIG. 4, the O-RUs of FIG. 1 are configured to report energy consumption EC and energy efficiency EE-related information via an open FH M-Plane interface to the E2 node (i.e., the O-DU).

In an example embodiment, the one or more O-RUs of FIG. 1 may be configured to report energy consumption EC and energy efficiency EE related information to the SMO/NRT-RIC directly.

Moreover, the one or more O-RUs of FIG. 1 may be configured to support actions required to perform EE/ES optimization and to report updated carrier configuration (e.g., to report the configuration status, for example, activation, deactivation, sleep, etc.).

For example, according to a communication between the O-DU and the O-RU, the E2 node(s) may be able to identify the individual capabilities of the O-RU(s), wherein the O-RU(s) may be configured to support all actions required to perform EE/ES optimization (e.g., according to the A1 policy).

FIG. 5 illustrates a flow diagram of a method for implementing an optimization of a carrier and/or cell switch off/on according to an embodiment.

Referring to FIG. 5, the method for implementing a carrier and/or cell switch off/on optimization in an open radio access network (O-RAN) based on an A1 policy may include functions such as a service management and orchestration (SMO) framework, a near-real-time radio intelligent controller (nRT-RIC), a non-real-time radio intelligent controller (NRT-RIC), a NRT-RIC framework and one or more rApp, The SMO framework/NRT-RIC framework and the nRT-RIC may function as a mediator between the rApps and the E2 node(s) and the O-RUs (via the E2 nodes) within the O-RAN in accordance with FIG. 1 and FIG. 4.

In step 501, the rApp collects data required to perform a cell and/or carrier switch off/on optimization (i.e., optimization data) through the NRT-RIC framework and the SMO framework via the nRT-RIC from the O-RU.

In an example embodiment, the collecting of the optimization data providing may include sending an optimization data collection request by the rApp via an R1 interface through the NRT-RIC framework and through the SMO function within the SMO framework (e.g., an A1, O1, O2 termination) to the E2-node. The E2 node may receive the optimization data collection request from the SMO function and collects the optimization data from the O-RU via an open front haul management plane FH M-Plane interface between the E2 node and the open radio unit O-RU.

In an example embodiment, with regard to the collection of optimization data, the E2 node may activate a measurement report (i.e., an EE/EC measurement report) towards an O-RU and the O-RU provides measurement data (i.e., input data) for the measurement report.

In step 502, based on the collected optimization data, the SMO (i.e., the rApp or the NRT-RIC) (re-)trains at least one artificial intelligence/machine learning (AI/ML) model. Moreover, for example, upon a request from a rApp to the NRT-RIC framework, the NRT-RIC framework may deploy a re-trained AI/ML model to the nRT-RIC.

In an example embodiment, the input data (i.e., optimization data) to train the AI/ML model may include the following measurement data to monitor energy consumption & energy efficiency EC/EE of one or more E2 Nodes and one or more O-RUs: Down Link Packet Data Convergence Protocol Service Data Unit DL PDCP SDU Data Volume per interface (Data Volume in DL delivered from O-CU-UP to O-DU, per Public Land Mobile Network PLMN, per quality of service QoS level, per slice, per F1-U interface, Xn-U interface, X2-U interface, Up Link Packet Data Convergence Protocol Service Data Unit UP PDCP SDU Data Volume per interface (Data Volume in UL delivered from O-CU-UP to O-DU, per public land mobile network PLMN, per quality of service QoS level, per slice, per F1-U interface, Xn-U interface, X2-U interface, Reference Signal Received Quality RSRQ measurement per Synchronization Signal Block SSB per cell, Reference Signals Received Power RSRP measurement per SSB per cell, Signal to Interference plus Noise Ratio SINR measurement per SSB per cell, energy consumption, power consumed by hardware component, transmit power, etc.

In an example embodiment, the NRT-RIC framework may (re-)train at least one AI/ML model. According to this example embodiment, the rApp may select an AI/ML model from a plurality of AI/ML models and send an initiation request for re-training the AI/ML model to the NRT-RIC framework. The rApp may monitor re-trained AI/ML model parameters and determine, based on the re-trained AI/ML model parameters, the update or retraining of the re-trained AI/ML model from the NRT-RIC framework.

In step 503, the rApp provides an A1 policy to prepare and execute the cell and/or carrier switch off/on optimization through the NRT-RIC framework to the nRT-RIC.

In an example embodiment, the A1 policy may be formulated based on the re-trained AI/ML model from the NRT-RIC framework.

In step 504, based on the provided A1 policy, the nRT-RIC collects data required to perform the cell and/or carrier switch off/on from the O-RU (i.e., implementation data) (e.g., via the E2-interface from the O-RU via the E2 node.

Moreover, in step 504, based on the deployed AI/ML model and the provided A1 policy, the nRT-RIC evaluates the collected data required to perform the cell and/or carrier switch off/on (i.e., the implementation data).

According to an example embodiment, the optimization and the implementation may include the same data required to perform the cell and/or carrier switch off/on at the O-RU.

According to an example embodiment, the optimization data and the implementation data may be data required to perform the cell and/or carrier switch off/on at the O-RU that are collected via different interfaces (O1, O2, A1, E2, etc.) within the O-RAN.

For example, the nRT-RIC interprets the provided A1 policy and applies AI/ML model inference to the collected data required to perform cell and/or carrier switch off/on (i.e., the implementation data).

In step 505, based on the evaluating, the nRT-RIC generates at least one E2 message to prepare and execute the cell and/or carrier switch off/on optimization and sends the at least one E2 message to the O-RU via the E2 node.

In an example embodiment, the nRT-RIC may generate at least one E2 control command and/or at least one E2 policy command for the E2 node that corresponds to the O-RU's capabilities and sends the E2 control command and/or at least one E2 policy command to the E2 node via the E2 interface to meet the predetermined performance objective (e.g., an EE/ES performance objective as formulated in the provided A1 policy).

In step 506, based on at least one E2 message, the E2 node and the O-RU implement the cell and/or carrier switch off/on optimization within the O-RAN.

For example, upon receiving at least one E2 message, the E2 node may convert at least one E2 message to prepare and execute the cell and carrier switch off/on to an implementation command for the O-RU, wherein the implementation command for the O-RU instructs the O-RU to execute the cell and/or carrier switch off/on via the open FH M-Plane.

In step 507, based on the implementation, the rApp receives an A1 policy feedback through an NRT-RIC framework from the O-RU via the E2 node and the nRT-RIC.

For example, the O-RU may notify the E2 node via the FH M-Plane interface about the completion of the implementation of the cell and/or carrier switch off/on. The E2 node, upon receiving the notification from the O-RU, notifies the nRT-RIC via an E2 interface. The NRT-RIC, upon receiving the notification from the nRT-RIC, notifies the rApp through the R1 interface through the NRT-RIC framework.

In another example embodiment, after the implementation in step 506, the rApp via the NRT-RIC framework may monitor the performance of the (re-)trained AI/ML model and determine that the predetermined performance objective is not achieved. In this case, the rApp and/or NRT-RIC may initiate a fallback mechanism and/or initiate the AI/ML model to be updated or to be retrained.

As a result, training the AI/ML model in the SMO/NRT-RIC framework and providing the trained AI/ML model along with an A1 policy to the nRT-RIC allows for a generation of E2 messages and implementation feedback thereof (i.e., an A1 policy feedback to initiate fallback measures to pertain the performance objective). This has the advantage that a network operator can flexibly configure the optimal carrier and/or cell and/or carrier switch off/on parameters (i.e., generate an optimal E2 control command(s)

and/or E2 policy command(s)) in a cell or cluster of cells to maximize energy efficiency management in the O-RAN.

FIG. 6 illustrates a flow diagram of a method for implementing a carrier and/or cell switch off/on optimization based on an A1 policy according to an embodiment.

Referring to FIG. 6, while collecting the data required to perform the cell and/or carrier switch off/on by the nRT-RIC, in step 601, the nRT-RIC interprets the provided A1 policy for cell and/or carrier switch off/on (i.e., the A1 policy provided by the rApp via the NRT-RIC).

In step 602, based on the interpretation of the A1 policy, the nRT-RIC sends a data collection request via an E2 interface to the E2 node.

In step 603, the E2 node receives the data collection request from the nRT-RIC and collects the data required to perform the cell and/or carrier switch off/on from the O-RU (e.g., via the open FH M-Plane interface).

In step 604, the E2 node sends the collected data required to perform the cell and/or carrier switch off/on via the E2 interface to the nRT-RIC.

As a result, the interpretation of the A1 policy in the nRT-RIC enables an up-to-date generation of E2 messages (i.e., generate an optimal E2 control command(s) and/or E2 policy command(s)) based on the latest (updated or modified) A1 policy. The A1 policy feedback actions (i.e., the initiation of fallback measures) of the rApp have the advantage that the nRT-RIC can generate the optimal E2 control policy in a cell or cell cluster to maximize energy efficiency management in the O-RAN and to flexibly meet changing conditions in the O-RAN.

FIG. 7 illustrates a flow diagram of a method for implementing a carrier and/or cell switch off/on optimization based on an A1 policy according to an embodiment. Referring to FIG. 7 while evaluating the data required to perform cell and/or carrier switch off/on, in step 701, the nRT-RIC receives the collected data required to perform the cell and/or carrier switch off/on from the E2 node via the E2 interface.

In step 702, based on the collected data required to perform the cell and/or carrier switch off/on, the nRT-RIC applies AI/ML model inference to evaluate the at least one E2 message.

In step 703, while generating the at least one E2 message to prepare and execute the cell and/or carrier switch off/on optimization the nRT-RIC, based on the AI/ML model inference, generates at least one at least one E2 control command and/or at least one E2 policy command for the E2 node that corresponds to the O-RU's capabilities.

In step 704, the nRT-RIC sends the at least one E2 control command and/or at least one E2 policy command to the E2 node (e.g., via the E2 interface).

As a result, according to the embodiment as set forth in FIG. 7, the AI/ML Model Inference at the nRT-RIC provides an E2 control command and/or at least one E2 policy command for the E2 node that corresponds to the O-RU's capabilities near real-time (e.g., within a latency between 10 ms and 1 s) that allows a network operator to flexibly (i.e., fast) configure carrier and/or cell switch off/on parameters in a cell or in a cluster of cells to optimize the energy efficiency management in the O-RAN.

FIG. 8 illustrates a flow diagram of a method for implementing a carrier and/or cell switch off/on optimization based on an A1 policy according to another embodiment.

Referring to FIG. 8, while receiving the A1 policy feedback from the O-RU, in step 801, the O-RU notifies the A1 policy feedback based on feedback on at least one E2 message from the O-RU towards the rApp through NRT-RIC framework and SMO framework.

In step 802, the E2 node notifies an E2 message feedback based on the completion of the implementation of the cell and/or carrier to switch off/on (i.e., based on the notification of the O-RU in step 801) to the nRT-RIC (e.g., via the E2 interface).

In step 803, the nRT-RIC notifies an A1 control feedback based on the E2 message feedback towards the rApp through the NRT-RIC framework/SMO framework.

As a result, the individual notification may provide detailed A1 control feedback including feedback data from all lower network layer functions (i.e., the O-DU, O-CU, O-RU, etc.) This detailed A1 control feedback allows a precise reformulation of the A1 policy to maximize the fulfillment of performance objectives or to enhance the training of the AI/ML models to achieve optimal AI/ML model inference at the nRT-RIC. The individual notification has the advantage that the ES/EE can be precisely implemented to maximize the energy efficiency of the O-RAN.

FIG. 9 illustrates a flow diagram of a method for implementing a carrier and/or cell switch off/on optimization based on an A1 policy according to another embodiment.

Referring to FIG. 9, in step 901, the nRT-RIC notifies A1 policy feedback based on feedback on at least one E2 message from the O-RU towards the rApp through the NRT-RIC framework and/or SMO framework.

In step 902, the rApp monitors at least one performance objective (i.e., based on the A1 policy feedback, a performance indicator, the performance of the AI7ML model, etc.). For example, the rApp may analyze the A1 policy feedback.

In step 903, the rApp determines that at least one predetermined performance objective is not achieved based on the notified A1 control feedback.

For example, the rApp may monitor and analyze the performance objective(s) that relate(s) to the fulfillment of the O-RAN intent to optimize the carrier and/or cell switch off/on at the O-RU(s) (e.g., in order to allow the operator to flexibly configure Carrier and Cell Switch Off/On parameters for EE/ES management of the O-RU(s)).

To this end, the rApp may constantly monitor, for example, the performance and the energy consumption of the E2 Node and the energy consumption of the O-RU.

In step 904, the rApp initiates a fallback mechanism to pertain to at least one predetermined performance objective.

In step 905, wherein while initiating the fallback mechanism, the rApp, modifies the A1 policy to prepare and execute the cell and/or carrier switch off/on based on the predetermined performance objective.

In step 906, the rApp requests the NRT-RIC to deploy the modified A1 policy from the NRT-RIC framework to the nRT-RIC.

Alternatively, in steps 905 and 906, wherein while initiating the fallback mechanism, the rApp may initiate an AI/ML model update and/or retraining based on the predetermined performance objective. To this end, in case the rApp may send an initiation request for re-training the AI/ML model to the NRT-RIC framework. Upon receiving the request, the NRT-RIC (re-)trains the AI/ML model by the NRT-RIC framework. During the training, the rApp monitors re-trained AI/ML model parameters, and based on the re-trained AI/ML model parameters, the rApp determines to request the NRT-RIC to deploy the re-trained AI/ML model from the NRT-RIC framework to the nRT-RIC.

As a result, the initiation of fallback mechanisms (i.e., fallback measures) to pertain to the O-RAN intent to optimize at least one E2 control command and/or at least one E2 policy command based on the predetermined performance objective (performance targets) allows for generating modified A1 policies and/or updated AI/ML models that consider changing conditions on the O-RAN.

This has the advantage that a flexible configuration of the carrier and/or cell off/on parameters can be realized in one cell or in a cluster of cells, which can be optimally adapted to the changing conditions in the O-RAN.

FIG. 10 illustrates a flow diagram of a method for implementing a carrier and/or cell switch off/on optimization based on an A1 policy according to another embodiment.

Referring to FIG. 10, while re-training at least one AI/ML model according to the alternative fallback measure in step 904 of FIG. 9, in step 1001, the rApp selects an AI/ML model from a plurality of AI/ML models.

In step 1002, the rApp sends an initiation request for re-training the AI/ML model to the NRT-RIC framework.

In step 1003, the NRT-RIC (re-)trains the AI/ML model by the NRT-RIC framework.

In step 1004, the rApp monitors the re-trained AI/ML model parameters and based on the re-trained AI/ML model parameters, requests the NRT-RIC to deploy the re-trained AI/ML model from the NRT-RIC framework to the nRT-RIC.

As a result, the initiation of fallback mechanisms to pertain to the O-RAN intent to optimize E2 configuration data to prepare and execute the cell and/or carrier switch off/on based on the predetermined performance objective (performance targets) allows optimally trained AI/ML models that consider changing conditions on the O-RAN. This has the advantage that a flexible configuration of the carrier and/or cell off/on parameters can be realized in one cell or in a cluster of cells, which can be optimally adapted to the changing conditions in the O-RAN.

Figure 11:
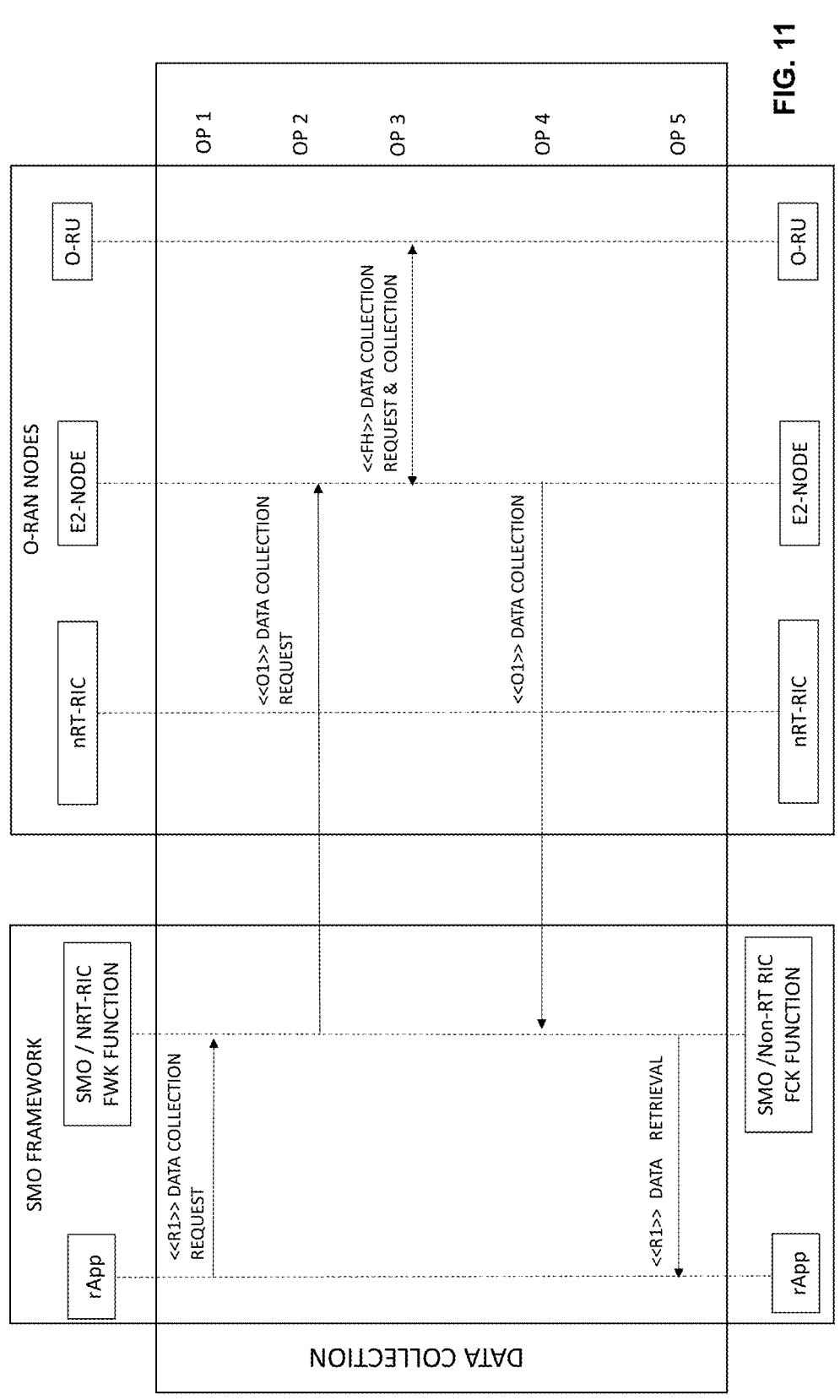
FIG. 11 illustrates a data collection flow according to an embodiment.

FIG. 11 illustrates a method for data collection according to an embodiment. Referring to FIG. 11, the data collection aims for enabling A1 policy-based carrier and/or cell switch off/on energy caving functions in the O-RAN by means of configuration parameter change and actions controlled by the nRT-RIC and to allow for AI/ML-based generation of configuration data required to perform a carrier and cell switch off/on at the O-RU.

To this end, the SMO framework and the NRT-RIC framework include A1 termination functions and O1 termination functions to enable O1 interface communication and the A1 interface communication within the O-RAN. The NRT-RIC framework and/or the rApp(s) may carry out the carrier and cell switch off/on optimization. The E2 node and the O-RU may enforce (i.e., implement) the carrier and cell switch off/on optimization configurations.

Referring to FIG. 11, once when R1 interface and the O1 interface connectivity, the A1 interface connectivity and the open FH M-Plane interface connectivity are established, the communication paths between the rApp(s) and the E2 node(s) and the O-RU and between the NRT-RIC and the nRT-RIC is established and the O-RAN is operational. Furthermore, according to the status of the operational O-RAN infrastructure, the nRT-RIC obtained knowledge about overlapping carriers/cells and the coverage of those carriers/cells (e.g., which carrier/cell is a coverage layer, and which is a capacity layer).

In order to optimize the EE/ES with the O-RAN, a network operator may set performance targets for energy saving ES functions in the NRT-RIC (i.e., predetermined performance parameters for EE/ES within the O-RAN, for example, one or more predetermined performance objectives for EE/EC within the O-RAN). These targets for energy savings ES functions in the NRT-RIC may be formulated in a respective A1 policy.

As a result, the method for optimizing a carrier and/or cell switch off/on based on an A1 policy may start when a network operator enables the optimization rApp along with an initial AI/ML model for carrier and cell switch off/on ES functions and the E2 Node and the O-RU become operational.

In operation 1, the method for implementing a carrier and/or cell switch off/on optimization in an open radio access network (O-RAN) based on an A1 policy may start when a network operator enables the optimization rApp along with an initial AI/ML Model for carrier and cell switch off/on Energy Savings ES functions and the E2 node(s) and the O-RU(s) become operational. At his time, in operation 1, the rApp requests to collect optimization data (i.e., data required to perform a cell and/or carrier switch off/on optimization). For example, configurations, performance indicators, measurement data (e.g., cell load-related information and traffic information, EE/EC measurement reports, cell level configurations), etc. towards SMO framework and/or NRT-RIC framework via the R1 interface.

In operation 2, the SMO framework and/or NRT-RIC framework functions request the collection of optimization data from the E2 node and the O-RU (via the E2 node)

For example, the SMO framework and/or NRT-RIC framework functions request the collection of optimization data from the E2 node over the O1 interface.

In operation 3, upon receiving the request from SMO framework and/or NRT-RIC framework functions, the E2 node (i.e., the O-CU, O-DU, etc.) requests and collects data necessary for optimizing a carrier and/or cell switch off/on (i.e., the configuration data, configured measurement data) from O-RU. For example, the E2 node collects data from the O-RU via the open FH M-Plane interface.

In operation 4, the E2 node (i.e., the O-CU, O-DU, etc.) sends the optimization data, such as configuration data, configured measurement data, etc. to the SMO/NRT-RIC framework periodically or event-based.

In operation 5, the NRT-RIC retrieves the optimization data (i.e., configuration data, configured measurement data, etc. for processing (e.g., for consuming and/or producing R1 services related to EE/ES) and provides the optimization data to the rApp (e.g., via the R1 interface).

Figure 12:
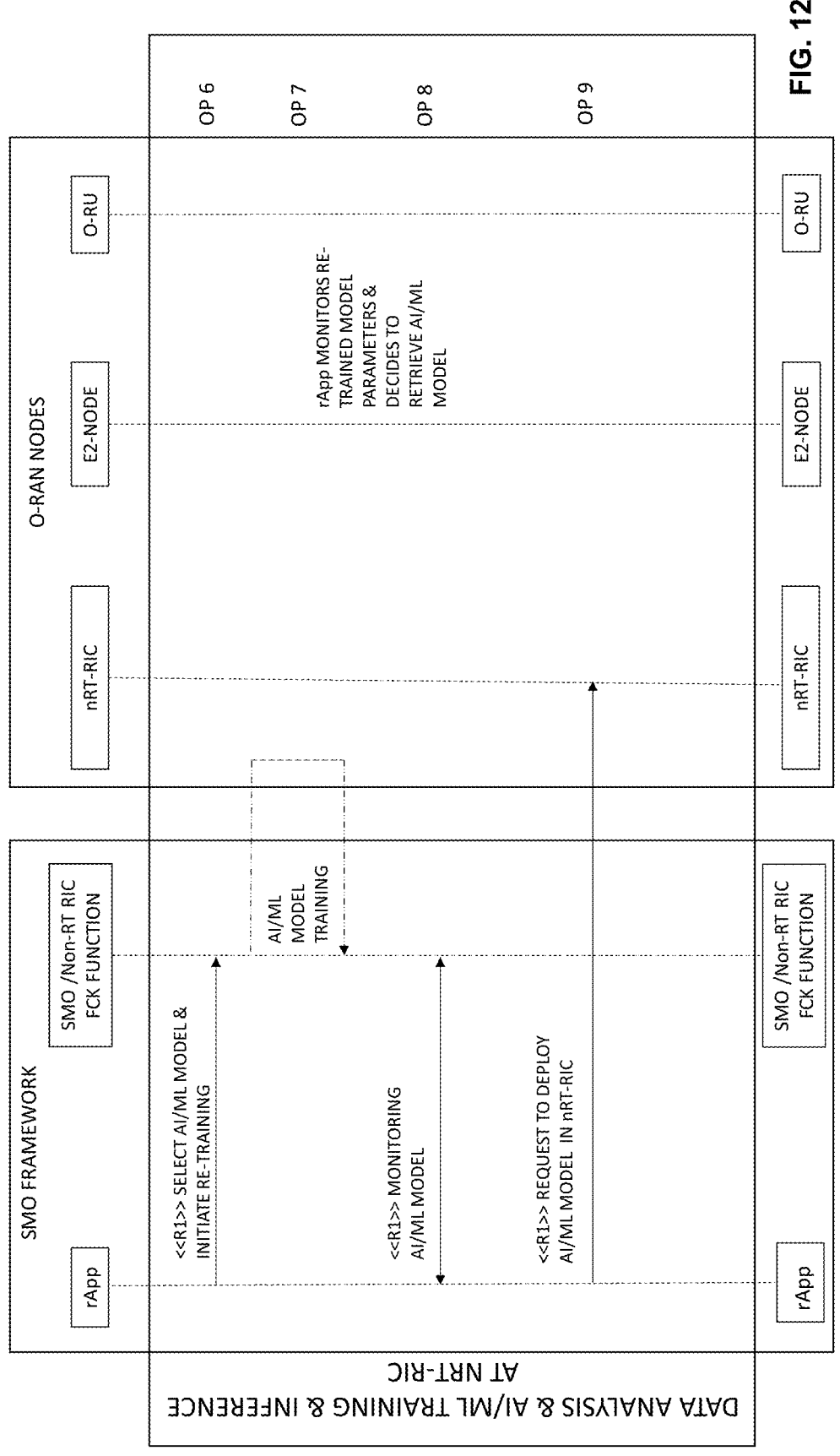
FIG. 12 illustrates an AI/ML model training flow at the NRT-RIC according to an embodiment.

FIG. 12 illustrates a method for AI/ML model training at the NRT-RIC according to an embodiment. Referring to FIG. 12, in operation 6, in case the NRT-RIC framework is hosting the (re-)training of at least one AI/ML model, among the plurality of AI/ML models, the rApp selects an AI/ML Model among the plurality of AI/ML models and initiates retraining of the selected AI/ML Model on Non-RT-RIC framework. In an example embodiment, the AI/ML model (re-)training and selection may be performed by a flexible AI/ML workflow within the SMO (i.e., the NRT-RIC framework and the rApp may cooperate in the AI/ML workflow to achieve optimal results).

In operation 7, upon receiving a (re-)training request from the rApp, the NRT-RIC framework initiates AI/ML model retraining.

In operation 8, the rApp monitors the retrained AI/ML models (i.e., the rApp analyses the performance of the retrained AI/ML models).

In operation 9, once the rApp determines that AI/ML model retraining was finalized (i.e., based on the monitoring of the AI/ML model parameters), the rApp requests the NRT-RIC to deploy at least one AI/ML model (including the (re-)trained AI/ML model) to the nRT-RIC (e.g., through the R1 interface via the SMO/NRT-RIC framework according to FIG. 4).

Figure 13:
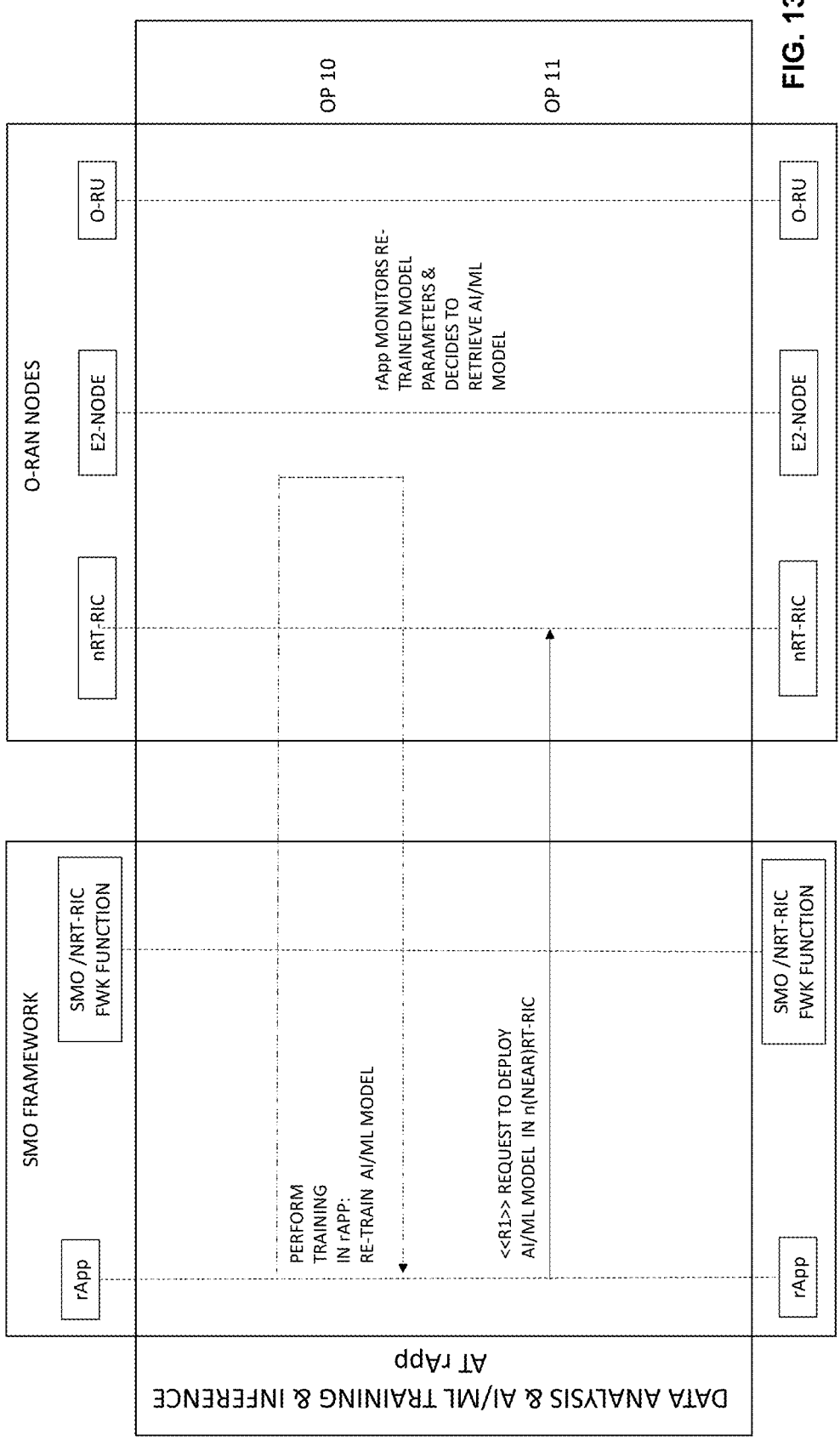
FIG. 13 illustrates an AI/ML model training flow at the rApp according to an embodiment.

FIG. 13 illustrates an AI/ML model training flow at the rApp according to an embodiment. Referring to FIG. 13, in operation 10, the AI/ML model retraining is hosted in the rApp, and the AI/ML model is retrained by the rApp itself.

In operation 11, once the rApp determines that AI/ML model retraining was finalized, the rApp transfers at least one AI/ML model (including the (re-) trained AI/ML model) to the SMO framework/NRT-RIC framework for deployment to the nRT-RIC (i.e., the rApp requests the NRT-RIC to deploy the AI/ML model to the nRT-RIC).

Referring to FIG. 12 and FIG. 13, in operations 9 and 11, respectively, the rApp constantly monitors the performance and energy consumption of the E2 Node(s), the energy consumption of O-RU(s), etc.

In an example embodiment, the input data (i.e., optimization data) used in the AI/ML model training may include the following measurement data to monitor energy consumption and energy efficiency EC/EE of one or more E2 nodes and one or more O-RUs: Down Link Packet Data Convergence Protocol Service Data Unit DL PDCP SDU Data Volume per interface (Data Volume in DL delivered from O-CU-UP to O-DU, per public land mobile network PLMN, per quality of service QoS level, per slice, per F1-U interface, Xn-U interface, X2-U interface, Up Link Packet Data Convergence Protocol Service Data Unit UP PDCP SDU Data Volume per interface (Data Volume in UP delivered from O-CU-UP to O-DU, per public land mobile network PLMN, per quality of service QoS level, per slice, per F1-U interface, Xn-U interface, X2-U interface, Reference Signal Received Quality RSRQ measurement per Synchronization Signal Block SSB per cell, Reference Signals Received Power RSRP measurement per SSB per cell, Signal to Interference plus Noise Ratio SINR measurement per SSB per cell, Energy consumption, Power consumed by hardware component, Transmit power, etc.

Figure 14:
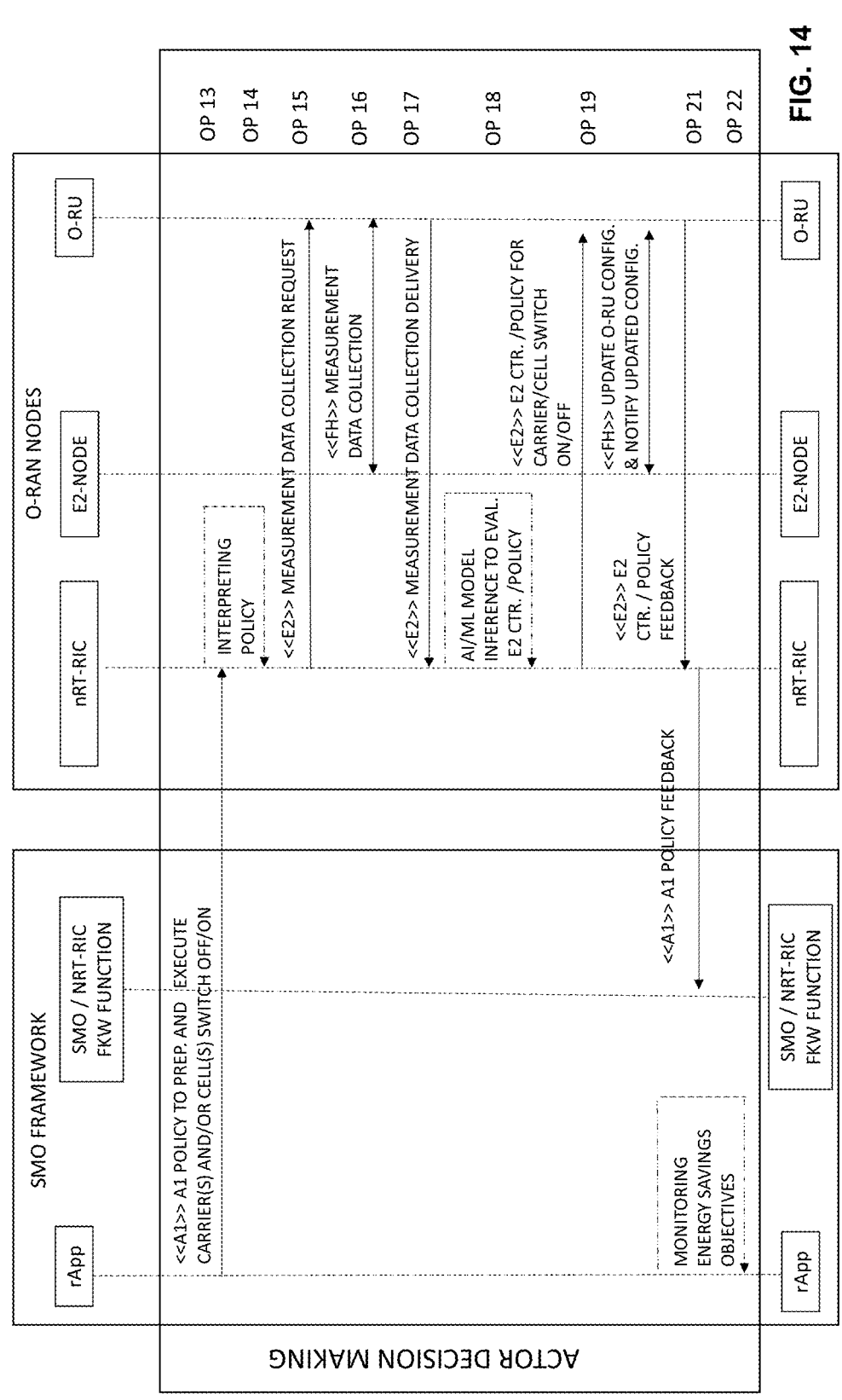
FIG. 14 illustrates a method for the generation and implementation of E2 message(s) to prepare and execute the cell and/or carrier switch off/on based on an A1 policy according to an embodiment.
Figure 15:
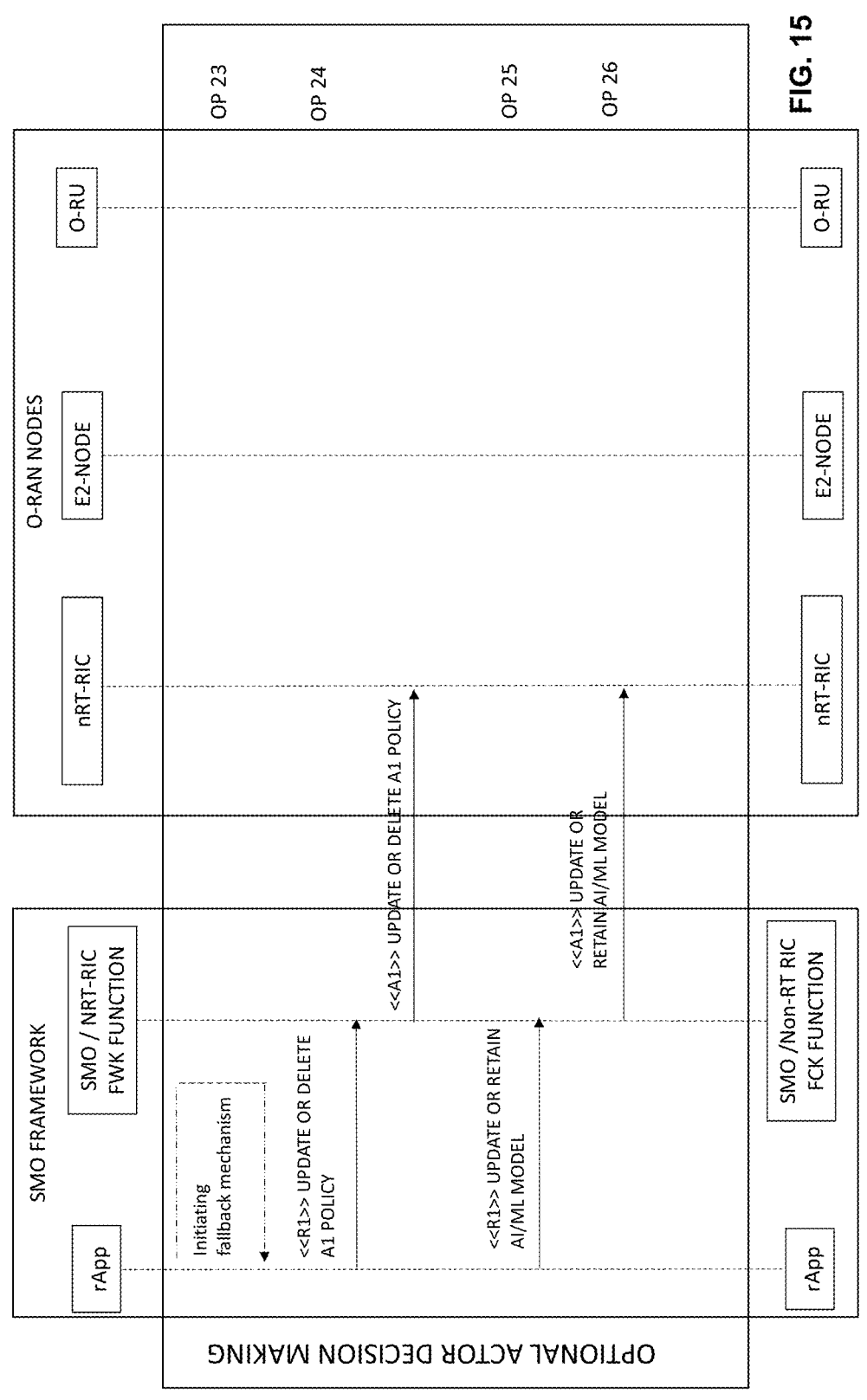
FIG. 15 illustrates a method for the modification of an A1 policy based on the A1 Policy feedback via the E2 interface according to an embodiment.

FIG. 14 illustrates the generation and implementation of E2 message(s) to prepare and execute the cell and/or carrier switch off/on based on an A1 policy according to an embodiment.

Referring to FIG. 14, in operation 13, the rApp provides an A1 policy to prepare and execute the cell and/or carrier switch off/on via an R1 interface through the NRT-RIC framework and via an A1 interface through an A1-related function within the NRT-RIC framework to the nRT-RIC. For example, the rApp triggers an EE/ES optimization through A1 policies to prepare and execute the cell(s) and carrier(s) switch off/on.

In operation 14, the nRT-RIC interprets the A1 policy for cell and/or carrier switch off/on.

In operation 15, based on the interpretation of the A1 policy, the nRT-RIC sends a data collection request via an E2 interface to the E2-node.

In operation 16, upon receiving the E2-related data collection request from the nRT-RIC function, the E2 node collects the requested data required to perform the cell and/or carrier switch off/on from the O-RU (e.g., via the open FH M-Plane).

In operation 17, the E2 node sends the collected data via the E2 interface to the nRT-RIC.

In operation 18, upon receiving the collected data required to perform the cell and/or carrier switch off/on from the E2 node via the E2 interface, the nRT-RIC, based on the received E2-related data, applies AI/ML model inference to evaluate at least one E2 message (e.g., the necessary E2 control commands and/or E2 policy commands that are necessary to apply the implementation of the cell and/or carrier switch off/on at the O-RU).

In operation 19, based on the AI/ML model inference, the nRT-RIC generates at least one E2 control command and/or at least one E2 policy command for the E2 node that corresponds to the O-RU's capabilities and sends the E2 message to the E2 node via the E2 interface. For example, the E2 message(s) may include E2 configuration data to prepare and execute the cell and/or carrier switch off/on that meet energy savings target(s) formulated in the A1 policy and that correspond to the O-RU's capabilities (e.g., meet the requirements of the O-RU's internal system architecture).

In operation 20, based on the E2 message (e.g., the E2 configuration data to prepare and execute the cell and/or carrier switch off/on) the E2 node and the O-RU implement the cell and/or carrier switch off/on within the O-RAN. According to an example embodiment, the E2 node, while implementing the E2 message, may convert at least one E2 control command and/or at least one E2 policy command to prepare and execute the cell and/or carrier switch off/on to implementation instruction commands, wherein the implementation instruction commands instruct the O-RU to execute the cell and/or carrier switch off/on. For example, the E2 node instructs the O-RU(s) to update configurations in order to execute the cell or carrier switch off/on.

In operation 21, based on the completion of the implementation according to operation 20, the rApp receives an A1 policy feedback (e.g., via an R1 interface through an NRT-RIC framework and via an A1 interface through an A1-related function within the NRT-RIC framework) from the E2 node (i.e., the nRT-RIC feedbacks the E2 control/policy to the rApp).

In an example embodiment, the O-RU may notify the completion of the implementation of the cell and/or carrier switch off/on towards the E2 node via the FH M-Plane interface between the E2 node and the O-RU. Accordingly, the E2 may notify the feedback on the E2 message(s) (e.g., at least one E2 control command and/or at least one E2 policy command) based on the completion of the implementation of the cell and/or carrier switch off/on (i.e., based on the notification of the O-RU) to the nRT-RIC via the E2 interface. Upon receiving the feedback on the E2 message(s), the nRT-RIC may notify an A1 policy feedback based on the feedback on the E2 message(s), towards the rApp (e.g., through SMO framework functions and via an R1 interface through the NRT-RIC framework within the SMO framework).

In operation 22, the rApp monitors at least one performance objective based on the A1 policy feedback. For example, monitors whether the A1 policy feedback indicates that the interpretation, implementation, etc. of the A1 policy (e.g., related to energy savings objectives) was successful.

In operation 23, the rApp, based on the monitoring (i.e., the A1 policy feedback) in operation 22, may determine that a predetermined performance objective is not achieved (i.e., based on the E2 control policy feedback). In this case, the rApp initiates at least one fallback mechanism to pertain to the predetermined performance objective.

In operation 24, based on the initiation, the rApp may modify the A1 policy to prepare and execute the cell and/or carrier switch off/on optimization based on the predetermined performance objective and send the modified A1 policy to the NRT-RIC. For example, the rApp may update or delete an A1 policy for carrier and/or cell switch off/on optimization and send the modified A1 policy to the NRT-RIC.

In operation 25, based on the initiation, the rApp may initiate an AI/ML model update and/or an AI/ML model retraining based on the predetermined performance objective (e.g., based on an evaluation of energy saving objectives).

In operation 26, upon the initiation of an AI/ML model update, the NRT-RIC framework may send an update (i.e., updated AI/ML model) or deploys a retrained AI/ML model to the nRT-RIC.

The method for implementing a carrier and/or cell switch off/on optimization based on an A1 policy may end when the E2 node(s) become(s) non-operational or when the operator disables the optimization rApp or the AI/ML model(s) for the Energy Saving (ES) function(s). However, as long as the optimization rApp is enabled, the rApp continues monitoring of the ES functions at the E2 node and O-RU, wherein the E2 node and O-RU operate using the updated parameters/models and state (off/on) (i.e., implement the latest E2 message(s) from the nRT-RIC that include up-to-date E2 control command(s) and/or up-to-date E2 policy command(s) to prepare and execute the cell and/or carrier switch off/on).

As a result, the systems and methods implement an NRT-RIC framework that allows a network operator to flexibly configure carrier and/or cell switch off/on parameters in a cell or in a cluster of cells to optimize overall network energy efficiency in the O-RAN.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a microservice(s), module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Various further respective aspects and features of embodiments of the present disclosure may be defined by the following items:

Item [1]: A system for implementing a carrier and/or cell switch off/on optimization in an open radio access network (O-RAN) based on an A1 policy, the system may include: a memory storing instructions; and at least one processor configured to implement a service management and orchestration (SMO) framework, a near-real-time radio intelligent controller (nRT-RIC), a non-real-time radio intelligent controller (NRT-RIC), a NRT-RIC framework and a rApp, the at least one processor configured to execute the instructions to: collect, by the rApp, data required to perform a cell and/or carrier switch off/on optimization through the NRT-RIC framework and/or the SMO framework via the nRT-RIC from an open radio unit (O-RU); based on the collected optimization data, by the SMO, re-train at least one artificial intelligence/machine learning (AI/ML) model and, among the at least one re-trained AI/ML, deploy, by the NRT-RIC framework, one re-trained AI/ML model to the nRT-RIC; provide, by the rApp, an A1 policy to prepare and execute the cell and/or carrier switch off/on optimization through the NRT-RIC framework to the nRT-RIC; based on the provided A1 policy, by the nRT-RIC, collect data required to perform the cell and/or carrier switch off/on via the E2-interface from the O-RU via the E2 node; based on the deployed AI/ML model and the provided A1 policy, evaluate, by nRT-RIC, the collected data required to perform the cell and/or carrier switch off/on; based on the evaluating, generate, by the nRT-RIC, at least one E2 message to prepare and execute the cell and/or carrier switch off/on optimization and send, by the nRT-RIC, the at least one E2 message to the O-RU via the E2 node; based on the at least one E2 message, implement, by the E2 node and the O-RU, the cell and/or carrier switch off/on optimization within the O-RAN; based on the implementing, receive, by the rApp, an A1 policy feedback through an NRT-RIC framework from the O-RU via the E2 node and the nRT-RIC.

Item [2]: The system according to item [1], wherein while collecting the data required to perform the cell and/or carrier switch off/on by the nRT-RIC, the at least one processor may be configured to: interpret, by the nRT-RIC, the provided A1 policy for cell and/or carrier switch off/on; based on the interpretation of the provided A1 policy, send, by the nRT-RIC, a data collection request via an E2 interface to the E2 node; receive, by the E2 node, the data collection request from the nRT-RIC and collect, by the E2 node, the data required to perform the cell and/or carrier switch off/on from the O-RU via the open FH M-Plane interface; and send, by the E2 node, the collected data required to perform the cell and/or carrier switch off/on via the E2 interface to the nRT-RIC.

Item [3]: The system according to item [2], wherein while evaluating the collected data required to perform the cell and/or carrier switch off/on, the at least one processor may be configured to: receive, by the nRT-RIC, the collected data required to perform the cell and/or carrier switch off/on from the E2 node via the E2 interface; based on the collected data required to perform the cell and/or carrier switch off/on, apply, by the nRT-RIC, AI/ML model inference to evaluate the at least one E2 message.

Item [4]: The system according to item [3], wherein while generating the at least one E2 message to prepare and execute the cell and/or carrier switch off/on optimization, the at least one processor may be configured to: based on the AI/ML model inference, generate, by the nRT-RIC, at least one E2 control command and/or at least one E2 policy command for the E2 node that corresponds to the O-RU's capabilities; send, by the nRT-RIC, the at least one E2 control command and/or the at least one E2 policy command to the E2 node via the E2 interface.

Item [5]: The system according to items [1]-[4], wherein while receiving the A1 policy feedback from the O-RU, the at least one processor may be further configured to: notify, by the nRT-RIC, the A1 policy feedback based on feedback on the at least one E2 message from the O-RU towards the rApp through the NRT-RIC framework and/or the SMO framework; based on the notified A1 policy feedback, monitor, by the rApp, at least one performance objective; determine that at least one predetermined performance objective is not achieved based on the notified A1 policy feedback; and initiate a fallback mechanism to pertain to the at least one predetermined performance objective.

Item [6]: The system according to item [5], wherein while initiating the fallback mechanism the at least one processor may be further configured to: based on the initiation, modify, by the rApp, the provided A1 policy to prepare and execute the cell and/or carrier switch off/on optimization based on the at least one predetermined performance objective; request, by the rApp, the NRT-RIC to deploy the modified A1 policy from the NRT-RIC framework to the nRT-RIC.

Item [7]: The system according to item [6], wherein while initiating the fallback mechanism the at least one processor may be further configured to: based on the initiation, by the rApp, initiates an AI/ML model update and/or retraining based on the at least one predetermined performance objective; update, by the rApp, an AI/ML model, wherein the updating may include: send, by the rApp, an initiation request for re-training the AI/ML model to the NRT-RIC framework; re-train, by the NRT-RIC, the AI/ML model by the NRT-RIC framework; monitor, by the rApp, re-trained AI/ML model parameters and based on the re-trained AI/ML model parameters, by the rApp, determine to request the NRT-RIC to deploy the re-trained AI/ML model from the NRT-RIC framework to the nRT-RIC.

Item [8]: A method for implementing a carrier and/or cell switch off/on optimization in an open radio access network (O-RAN) based on an A1 policy, the method may include: collecting, by a rApp, data required to perform a cell and/or carrier switch off/on optimization through the NRT-RIC framework and/or the SMO framework via the nRT-RIC from an open radio unit (O-RU) via an E2 node; based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC; providing, by a rApp, an A1 policy to prepare and execute the cell and/or carrier switch off/on optimization through the NRT-RIC framework to the nRT-RIC; based on the provided A1 policy, by the nRT-RIC, collecting data required to perform the cell and/or carrier switch off/on via the E2-interface from the O-RU via the E2 node; based on the deployed AI/ML model and the provided A1 policy, evaluating, by nRT-RIC, the collected data required to perform the cell and/or carrier switch off/on; based on the evaluating, generating, by the nRT-RIC, at least one E2 message to prepare and execute the cell and/or carrier switch off/on optimization and sending, by the nRT-RIC, the at least one E2 message to the O-RU via the E2 node; based on the at least one E2 message, implementing, by the E2 node and the O-RU, the cell and/or carrier switch off/on optimization within the O-RAN; based on the implementing, receiving, by the rApp, an A1 policy feedback through an NRT-RIC framework from the O-RU via the E2 node and the nRT-RIC.

Item [9]: The method according to item [8], wherein the collecting the data required to perform the cell and/or carrier switch off/on by the nRT-RIC may include: interpreting, by the nRT-RIC, the provided A1 policy for cell and/or carrier switch off/on; based on the interpretation of the provided A1 policy, sending, by the nRT-RIC, a data collection request via an E2 interface to the E2 node; receiving, by the E2 node, the data collection request from the nRT-RIC and collecting, by the E2 node, the data required to perform the cell and/or carrier switch off/on from the O-RU via the open FH M-Plane interface; and sending, by the E2 node, the collected data required to perform the cell and/or carrier switch off/on via the E2 interface to the nRT-RIC.

Item [10]: The method according to items [9], wherein the evaluating the collected data required to perform the cell and/or carrier switch off/on may include: receiving, by the nRT-RIC, the collected data required to perform the cell and/or carrier switch off/on from the E2 node via the E2 interface; based on the collected data required to perform the cell and/or carrier switch off/on, applying, by the nRT-RIC, AI/ML model inference to evaluate the at least one E2 message.

Item [11]: The method according to item [10], wherein the generating the at least one E2 message to prepare and execute the cell and/or carrier switch off/on optimization may include: based on the AI/ML model inference, generating, by the nRT-RIC, at least one E2 control command and/or at least one E2 policy command for the E2 node that corresponds to the O-RU's capabilities; sending, by the nRT-RIC, the at least one E2 control command and/or the at least one E2 policy command to the E2 node via the E2 interface.

Item [12]: The method according to items [8]-[13], wherein the receiving of the A1 policy feedback through an NRT-RIC framework from the O-RU via the E2 node and the nRT-RIC may include: notifying, by the nRT-RIC, the A1 policy feedback based on feedback on the at least one E2 message from the O-RU towards the rApp through the NRT-RIC framework and/or the SMO framework; based on the notified A1 policy feedback, monitoring, by the rApp, at least one performance objective; determining that at least one predetermined performance objective is not achieved based on the notified A1 policy feedback; and initiating a fallback mechanism to pertain to the at least one predetermined performance objective.

Item [13]: The method according to item [12], wherein the initiating the fallback mechanism may include: based on the initiation, modifying, by the rApp, the provided A1 policy to prepare and execute the cell and/or carrier switch off/on optimization based on the at least one predetermined performance objective; requesting, by the rApp, the NRT-RIC to deploy the modified A1 policy from the NRT-RIC framework to the nRT-RIC.

Item [14]: The method according to item [12], wherein the initiating the fallback mechanism may include: based on the initiation, by the rApp, initiating an AI/ML model update and/or retraining based on the at least one predetermined performance objective; updating, by the rApp, an AI/ML model, wherein the updating may include: sending, by the rApp, an initiation request for re-training the AI/ML model to the NRT-RIC framework; re-train, by the NRT-RIC, the AI/ML model by the NRT-RIC framework; based on the re-trained AI/ML model parameters, by the rApp, determining to request the NRT-RIC to deploy the re-trained AI/ML model from the NRT-RIC framework to the nRT-RIC.

Item [15]: A non-transitory computer-readable recording medium having recorded thereon instructions executable by at least one processor, the at least one processor further configured to perform a method for implementing a carrier and/or cell switch off/on optimization in an open radio access network (O-RAN) based on an A1 policy, the method may include: collecting, by a rApp, data required to perform a cell and/or carrier switch off/on optimization through the NRT-RIC framework and/or the SMO framework via the nRT-RIC from an open radio unit (O-RU) via an E2 node; based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC; providing, by a rApp, an A1 policy to prepare and execute the cell and/or carrier switch off/on optimization through the NRT-RIC framework to the nRT-RIC; based on the provided A1 policy, by the nRT-RIC, collecting data required to perform the cell and/or carrier switch off/on via the E2-interface from the O-RU via the E2 node; based on the deployed AI/ML model and the provided A1 policy, evaluating, by nRT-RIC, the collected data required to perform the cell and/or carrier switch off/on; based on the evaluating, generating, by the nRT-RIC, at least one E2 message to prepare and execute the cell and/or carrier switch off/on and sending, by the nRT-RIC, the at least one E2 message to the O-RU via the E2 node; based on the at least one E2 message, implementing, by the E2 node and the O-RU, the cell and/or carrier switch off/on optimization within the O-RAN; based on the implementing, receiving, by the rApp, an A1 policy feedback through an NRT-RIC framework from the O-RU via the E2 node and the nRT-RIC.

Item [16]: The non-transitory computer-readable recording medium according to item [15], wherein the collecting the data required to perform the cell and/or carrier switch off/on by the nRT-RIC may include: interpreting, by the nRT-RIC, the provided A1 policy for cell and/or carrier switch off/on; based on the interpretation of the provided A1 policy, sending, by the nRT-RIC, a data collection request via an E2 interface to the E2 node; receiving, by the E2 node, the data collection request from the nRT-RIC and collecting, by the E2 node, the data required to perform the cell and/or carrier switch off/on from the O-RU via the open FH M-Plane interface; and sending, by the E2 node, the collected data required to perform the cell and/or carrier switch off/on via the E2 interface to the nRT-RIC.

Item [17]: The non-transitory computer-readable recording medium according to item [16], wherein the evaluating the collected data required to perform the cell and/or carrier switch off/on may include: receiving, by the nRT-RIC, the collected data required to perform the cell and/or carrier switch off/on from the E2 node via the E2 interface; based on the collected data required to perform the cell and/or carrier switch off/on, applying, by the nRT-RIC, AI/ML model inference to evaluate the at least one E2 message.

Item [18]: The non-transitory computer-readable recording medium according to item [17], wherein the generating the at least one E2 message to prepare and execute the cell and/or carrier switch off/on optimization may include: based on the AI/ML model inference, generating, by the nRT-RIC, at least one E2 control command and/or at least one E2 policy command for the E2 node that corresponds to the O-RU's capabilities; sending, by the nRT-RIC, the at least one E2 control command and/or the at least one E2 policy command to the E2 node via the E2 interface.

Item [19]: The non-transitory computer-readable recording medium according to items [15]-[18], wherein the receiving of the A1 policy feedback through an NRT-RIC framework from the O-RU via the E2 node and the nRT-RIC may include: notifying, by the nRT-RIC, the A1 policy feedback based on feedback on the at least one E2 message from the O-RU towards the rApp through the NRT-RIC framework and/or the SMO framework; based on the notified A1 policy feedback, monitoring, by the rApp, at least one performance objective; determining that at least one predetermined performance objective is not achieved based on the notified A1 policy feedback; and initiating a fallback mechanism to pertain to the at least one predetermined performance objective.

Item [20]: The non-transitory computer-readable recording medium according to item [19], wherein the initiating the fallback mechanism may include: based on the initiation, modifying, by the rApp, the provided A1 policy to prepare and execute the cell and/or carrier switch off/on optimization based on the at least one predetermined performance objective; requesting, by the rApp, the NRT-RIC to deploy the modified A1 policy from the NRT-RIC framework to the nRT-RIC.

What is claimed is:

1. A system for implementing at least one of carrier or cell switch off/on optimization in an open radio access network (O-RAN) based on an A1 policy, the system comprising:
   a memory storing instructions; and
   at least one processor configured to implement a service management and orchestration (SMO) framework, a near-real-time radio intelligent controller (nRT-RIC), a non-real-time radio intelligent controller (NRT-RIC), a NRT-RIC framework and an application (rApp), the at least one processor configured to execute the instructions to:

collect, by the application (rApp), data to perform at least one of cell or carrier switch off/on optimization through at least one of the NRT-RIC framework or the SMO framework via the nRT-RIC from an open radio unit (O-RU);

based on the collected optimization data, by the SMO, re-train at least one artificial intelligence/machine learning (AI/ML) model;

among the at least one re-trained AI/ML, deploy, by the NRT-RIC framework, a re-trained AI/ML model to the nRT-RIC;

provide, by the application (rApp), an A1 policy to prepare and execute the at least one of cell or carrier switch off/on optimization through the NRT-RIC framework to the nRT-RIC;

based on the provided A1 policy, by the nRT-RIC, collect data to perform the at least one of cell or carrier switch off/on from the O-RU via an E2 node;

based on the deployed AI/ML model and the provided A1 policy, evaluate, by nRT-RIC, the collected data to perform the at least one of cell or carrier switch off/on;

based on the evaluating, generate, by the nRT-RIC, at least one E2 message to prepare and execute the at least one of cell or carrier switch off/on optimization and send, by the nRT-RIC, the at least one E2 message to the O-RU via the E2 node;

based on the at least one E2 message, implement, by the E2 node and the O-RU, the at least one of cell or carrier switch off/on optimization within the O-RAN;

based on the implementing, receive, by the application (rApp), an A1 policy feedback through an NRT-RIC framework from the O-RU via the E2 node and the nRT-RIC.

2. The system as claimed in claim 1, wherein while collecting the data to perform the at least one of cell or carrier switch off/on by the nRT-RIC, the at least one processor is configured to:

interpret, by the nRT-RIC, the provided A1 policy for at least one of cell or carrier switch off/on;

based on the interpretation of the provided A1 policy, send, by the nRT-RIC, a data collection request via an E2 interface to the E2 node;

receive, by the E2 node, the data collection request from the nRT-RIC;

collect, by the E2 node, the data to perform the at least one of cell or carrier switch off/on from the O-RU via an open FH M-Plane interface; and send, by the E2 node, the collected data to perform the at least one of cell or carrier switch off/on via the E2 interface to the nRT-RIC.

3. The system as claimed in claim 2, wherein while evaluating the collected data to perform the at least one of cell or carrier switch off/on, the at least one processor is configured to:

receive, by the nRT-RIC, the collected data to perform the at least one of cell or carrier switch off/on from the E2 node via the E2 interface; and based on the collected data to perform the at least one of cell or carrier switch off/on, apply, by the nRT-RIC, AI/ML model inference to evaluate the at least one E2 message.

4. The system as claimed in claim 3, wherein while generating the at least one E2 message to prepare and execute the at least one of cell or carrier switch off/on optimization, the at least one processor is configured to:

based on the AI/ML model inference, generate, by the nRT-RIC, at least one of an E2 control command or an E2 policy command for the E2 node that corresponds to the O-RU's capabilities; and send, by the nRT-RIC, the at least one of the E2 control command or the at least one E2 policy command to the E2 node via the E2 interface.

5. The system as claimed in claim 1, wherein while receiving the A1 policy feedback from the O-RU, the at least one processor is further configured to:

notify, by the nRT-RIC, the A1 policy feedback based on feedback on the at least one E2 message from the O-RU towards the application (rApp) through the at least one of the NRT-RIC framework or the SMO framework;

based on the notified A1 policy feedback, monitor, by the application (rApp), at least one performance objective;

determine that at least one predetermined performance objective is not achieved based on the notified A1 policy feedback; and initiate a fallback mechanism to pertain to the at least one predetermined performance objective.

6. The system as claimed in claim 5, wherein while initiating the fallback mechanism the at least one processor is further configured to:

based on the initiation, modify, by the application (rApp), the provided A1 policy to prepare and execute the at least one of cell or carrier switch off/on optimization based on the at least one predetermined performance objective; and request, by the application (rApp), the NRT-RIC to deploy the modified A1 policy from the NRT-RIC framework to the nRT-RIC.

7. The system as claimed in claim 6, wherein while initiating the fallback mechanism the at least one processor is further configured to:

based on the initiation, by the application (rApp), initiates at least one of an AI/ML model update or an AI/ML model retraining based on the at least one predetermined performance objective;

update, by the application (rApp), an AI/ML model, by:

sending, by the application (rApp), an initiation request for re-training the AI/ML model to the NRT-RIC framework;

re-training, by the NRT-RIC, the AI/ML model by the NRT-RIC framework;

monitoring, by the application (rApp), re-trained AI/ML model parameters and based on the re-trained AI/ML model parameters, by the application (rApp), determining to request the NRT-RIC to deploy the re-trained AI/ML model from the NRT-RIC framework to the nRT-RIC.

8. A method for implementing at least one of carrier or cell switch off/on optimization in an open radio access network (O-RAN) based on an A1 policy, the method comprising:

collecting, by an application (rApp), data to perform at least one of cell or carrier switch off/on optimization through at least one of a non-real-time radio intelligent controller (NRT-RIC) framework or a service management and orchestration (SMO) framework via a near-real-time radio intelligent controller (nRT-RIC) from an open radio unit (O-RU) via an E2 node;

based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC;

providing, by an application (rApp), an A1 policy to prepare and execute the at least one of cell or carrier switch off/on optimization through the NRT-RIC framework to the nRT-RIC;

based on the provided A1 policy, by the nRT-RIC, collecting data to perform the at least one of cell or carrier switch off/on from the O-RU via an E2 node;

based on the deployed AI/ML model and the provided A1 policy, evaluating, by nRT-RIC, the collected data to perform the at least one of cell or carrier switch off/on;

based on the evaluating, generating, by the nRT-RIC, at least one E2 message to prepare and execute the at least one of cell or carrier switch off/on optimization and sending, by the nRT-RIC, the at least one E2 message to the O-RU via the E2 node;

based on the at least one E2 message, implementing, by the E2 node and the O-RU, the at least one of cell or carrier switch off/on optimization within the O-RAN;

based on the implementing, receiving, by the application (rApp), an A1 policy feedback through an NRT-RIC framework from the O-RU via the E2 node and the nRT-RIC.

9. The method as claimed in claim 8, wherein the collecting the data to perform the at least one of cell or carrier switch off/on by the nRT-RIC comprises:

interpreting, by the nRT-RIC, the provided A1 policy for at least one of cell or carrier switch off/on;

based on the interpretation of the provided A1 policy, sending, by the nRT-RIC, a data collection request via an E2 interface to the E2 node;

receiving, by the E2 node, the data collection request from the nRT-RIC;

collecting, by the E2 node, the data to perform the at least one of cell or carrier switch off/on from the O-RU via an open FH M-Plane interface; and sending, by the E2 node, the collected data to perform the at least one of cell or carrier switch off/on via the E2 interface to the nRT-RIC.

10. The method as claimed in claim 9, wherein the evaluating the collected data to perform the at least one of cell or carrier switch off/on comprises:

receiving, by the nRT-RIC, the collected data to perform the at least one of cell or carrier switch off/on from the E2 node via the E2 interface; and based on the collected data to perform the at least one of cell or carrier switch off/on, applying, by the nRT-RIC, AI/ML model inference to evaluate the at least one E2 message.

11. The method as claimed in claim 10, wherein the generating the at least one E2 message to prepare and execute the at least one of cell or carrier switch off/on optimization comprises:

based on the AI/ML model inference, generating, by the nRT-RIC, at least one of an E2 control command or an E2 policy command for the E2 node that corresponds to the O-RU's capabilities; and sending, by the nRT-RIC, the at least one of the E2 control command or the E2 policy command to the E2 node via the E2 interface.

12. The method as claimed in claim 8, wherein the receiving of the A1 policy feedback through an NRT-RIC framework from the O-RU via the E2 node and the nRT-RIC comprises:

notifying, by the nRT-RIC, the A1 policy feedback based on feedback on the at least one E2 message from the O-RU towards the application (rApp) through the at least one of the NRT-RIC framework or the SMO framework;

based on the notified A1 policy feedback, monitoring, by the application (rApp), at least one performance objective;

determining that at least one predetermined performance objective is not achieved based on the notified A1 policy feedback; and initiating a fallback mechanism to pertain to the at least one predetermined performance objective.

13. The method as claimed in claim 12, wherein the initiating the fallback mechanism comprises:

based on the initiation, modifying, by the application (rApp), the provided A1 policy to prepare and execute the at least one of cell or carrier switch off/on optimization based on the at least one predetermined performance objective; and requesting, by the application (rApp), the NRT-RIC to deploy the modified A1 policy from the NRT-RIC framework to the nRT-RIC.

14. The method as claimed in claim 12, wherein the initiating the fallback mechanism comprises:

based on the initiation, by the application (rApp), initiating at least one of an AI/ML model update or an AI/ML model retraining based on the at least one predetermined performance objective;

updating, by the application (rApp), an AI/ML model, wherein the updating comprises:

sending, by the application (rApp), an initiation request for re-training the AI/ML model to the NRT-RIC framework;

re-training, by the NRT-RIC, the AI/ML model by the NRT-RIC framework; and based on the re-trained AI/ML model parameters, by the application (rApp), determining to request the NRT-RIC to deploy the re-trained AI/ML model from the NRT-RIC framework to the nRT-RIC.

15. A non-transitory computer-readable recording medium having recorded thereon instructions executable by at least one processor, the at least one processor further configured to perform a method for implementing at least one of carrier or cell switch off/on optimization in an open radio access network (O-RAN) based on an A1 policy, the method comprising:

collecting, by an application (rApp), data to perform at least one of a cell or carrier switch off/on optimization through at least one of a non-real-time radio intelligent controller (NRT-RIC) framework or a service management and orchestration (SMO) framework via a near-real-time radio intelligent controller (nRT-RIC) from an open radio unit (O-RU) via an E2 node;

based on the collected optimization data, by the SMO, re-training at least one artificial intelligence/machine learning (AI/ML) model and, among the at least one re-trained AI/ML, deploying, by the NRT-RIC framework, one re-trained AI/ML model to the nRT-RIC;

providing, by an application (rApp), an A1 policy to prepare and execute the at least one of cell or carrier switch off/on optimization through the NRT-RIC framework to the nRT-RIC;

based on the provided A1 policy, by the nRT-RIC, collecting data to perform the at least one of cell or carrier switch off/on from the O-RU via an E2 node;

based on the deployed AI/ML model and the provided A1 policy, evaluating, by nRT-RIC, the collected data to perform the at least one of cell or carrier switch off/on;

based on the evaluating, generating, by the nRT-RIC, at least one E2 message to prepare and execute the at least one of cell or carrier switch off/on optimization and sending, by the nRT-RIC, the at least one E2 message to the O-RU via the E2 node;

based on the at least one E2 message, implementing, by the E2 node and the O-RU, the at least one of cell or carrier switch off/on optimization within the O-RAN;

based on the implementing, receiving, by the application (rApp), an A1 policy feedback through an NRT-RIC framework from the O-RU via the E2 node and the nRT-RIC.

16. The non-transitory computer-readable recording medium as claimed in claim 15, wherein the collecting the data to perform the at least one of cell or carrier switch off/on by the nRT-RIC comprises:

interpreting, by the nRT-RIC, the provided A1 policy for at least one of cell or carrier switch off/on;

based on the interpretation of the provided A1 policy, sending, by the nRT-RIC, a data collection request via an E2 interface to the E2 node;

receiving, by the E2 node, the data collection request from the nRT-RIC;

collecting, by the E2 node, the data to perform the at least one of cell or carrier switch off/on from the O-RU via an open FH M-Plane interface; and sending, by the E2 node, the collected data to perform the at least one of cell or carrier switch off/on via the E2 interface to the nRT-RIC.

17. The non-transitory computer-readable recording medium as claimed in claim 16, wherein the evaluating the collected data to perform the at least one of cell or carrier switch off/on comprises:

receiving, by the nRT-RIC, the collected data to perform the at least one of cell or carrier switch off/on from the E2 node via the E2 interface; and based on the collected data to perform the at least one of cell or carrier switch off/on, applying, by the nRT-RIC, AI/ML model inference to evaluate the at least one E2 message.

18. The non-transitory computer-readable recording medium as claimed in claim 17, wherein the generating the at least one E2 message to prepare and execute the at least one of cell or carrier switch off/on optimization comprises:

based on the AI/ML model inference, generating, by the nRT-RIC, at least one of an E2 control command or an E2 policy command for the E2 node that corresponds to the O-RU's capabilities; and sending, by the nRT-RIC, the at least one of the E2 control command or the E2 policy command to the E2 node via the E2 interface.

19. The non-transitory computer-readable recording medium as claimed in claim 15, wherein the receiving of the A1 policy feedback through an NRT-RIC framework from the O-RU via the E2 node and the nRT-RIC comprises:

notifying, by the nRT-RIC, the A1 policy feedback based on feedback on the at least one E2 message from the O-RU towards the application (rApp) through the at least one of the NRT-RIC framework or the SMO framework;

based on the notified A1 policy feedback, monitoring, by the application (rApp), at least one performance objective;

determining that at least one predetermined performance objective is not achieved based on the notified A1 policy feedback; and initiating a fallback mechanism to pertain to the at least one predetermined performance objective.

20. The non-transitory computer-readable recording medium as claimed in claim 19, wherein the initiating the fallback mechanism comprises:

based on the initiation, modifying, by the application (rApp), the provided A1 policy to prepare and execute the at least one of cell or carrier switch off/on optimization based on the at least one predetermined performance objective; and requesting, by the application (rApp), the NRT-RIC to deploy the modified A1 policy from the NRT-RIC framework to the nRT-RIC.

\* \* \* \* \*